(12) United States Patent
Luff et al.

(10) Patent No.: US 12,130,473 B2
(45) Date of Patent: Oct. 29, 2024

(54) OPTICAL COUPLER

(71) Applicant: Mellanox Technologies, Ltd., Yokneam (IL)

(72) Inventors: Jonathan Luff, La Canada Flintridge, CA (US); Wei Qian, Torrance, CA (US); Dimitrios Kalavrouziotis, Papagou (GR); Elad Mentovich, Tel Aviv (IL); Dazeng Feng, El Monte, CA (US)

(73) Assignee: Mellanox Technologies, Ltd., Yokneam (IL)

( * ) Notice: Subject to any disclaimer, the term of this patent is extended or adjusted under 35 U.S.C. 154(b) by 415 days.

(21) Appl. No.: 17/421,004

(22) PCT Filed: Jan. 2, 2020

(86) PCT No.: PCT/GR2020/000003
§ 371 (c)(1),
(2) Date: Jul. 6, 2021

(87) PCT Pub. No.: WO2020/141336
PCT Pub. Date: Jul. 9, 2020

(65) Prior Publication Data
US 2022/0099891 A1 Mar. 31, 2022

Related U.S. Application Data
(60) Provisional application No. 62/788,116, filed on Jan. 3, 2019.

(51) Int. Cl.
*G02B 6/122* (2006.01)
*G02B 6/12* (2006.01)
(Continued)

(52) U.S. Cl.
CPC ............. *G02B 6/1228* (2013.01); *G02B 6/30* (2013.01); *G02F 1/0157* (2021.01);
(Continued)

(58) Field of Classification Search
CPC ................... G02B 6/1228; G02B 6/30; G02B 2006/12121; G02B 2006/12142;
(Continued)

(56) References Cited

U.S. PATENT DOCUMENTS 7,065,300 B1 * 6/2006 Walker ................ H01S 5/18311
359/344
10,012,797 B1 * 7/2018 Nagarajan ............. H01S 5/1221
(Continued)

FOREIGN PATENT DOCUMENTS

CN 109073826 A1 12/2018
WO WO 2016/070186 A1 5/2016

OTHER PUBLICATIONS

International Search Report and Written Opinion from International Application No. PCT/GR2020/000003, dated Jun. 25, 2020, 18 pages.

*Primary Examiner* — John Bedtelyon
(74) *Attorney, Agent, or Firm* — Moore & Van Allen PLLC; Michael M. McCraw

(57) ABSTRACT

An optical interconnect device and the method of fabricating it are described. The device includes an in-plane laser cavity transmitting a light beam along a first direction, a Franz Keldysh (FK) optical modulator transmitting the light beam along the first direction, a mode-transfer module including a tapered structure disposed after the FK optical modulator along the first direction to enlarge the spot size of the light beam to match an external optical fiber and a universal coupler controlling the light direction. The tapered structure can be made linear or non-linear along the first direction.

The universal coupler passes the laser light to an in-plane external optical fiber if the fiber is placed along the first direction, or it is a vertical coupler in the case that the external optical fiber is placed perpendicularly to the substrate surface. The coupler is coated with highly reflective material.

11 Claims, 44 Drawing Sheets

(51) Int. Cl.
*G02B 6/30* (2006.01)
*G02F 1/015* (2006.01)

(52) U.S. Cl.
CPC .............. *G02B 2006/12121* (2013.01); *G02B 2006/12142* (2013.01); *G02B 2006/12147* (2013.01)

(58) Field of Classification Search
CPC .......... G02B 2006/12147; G02B 6/132; G02B 6/136; G02B 6/262; G02B 6/12002; G02B 6/305; G02B 6/32; G02B 6/4214; G02B 2006/12152; G02B 6/12004; G02B 6/14; G02B 6/4204; G02F 1/0157
USPC ............................ 385/1–4, 14, 43, 129–132
See application file for complete search history.

(56) References Cited

U.S. PATENT DOCUMENTS

2016/0156147 A1 6/2016 Raino et al.
2017/0207600 A1* 7/2017 Klamkin ................. H01S 5/142
2017/0336565 A1 11/2017 Ryckman et al.

* cited by examiner

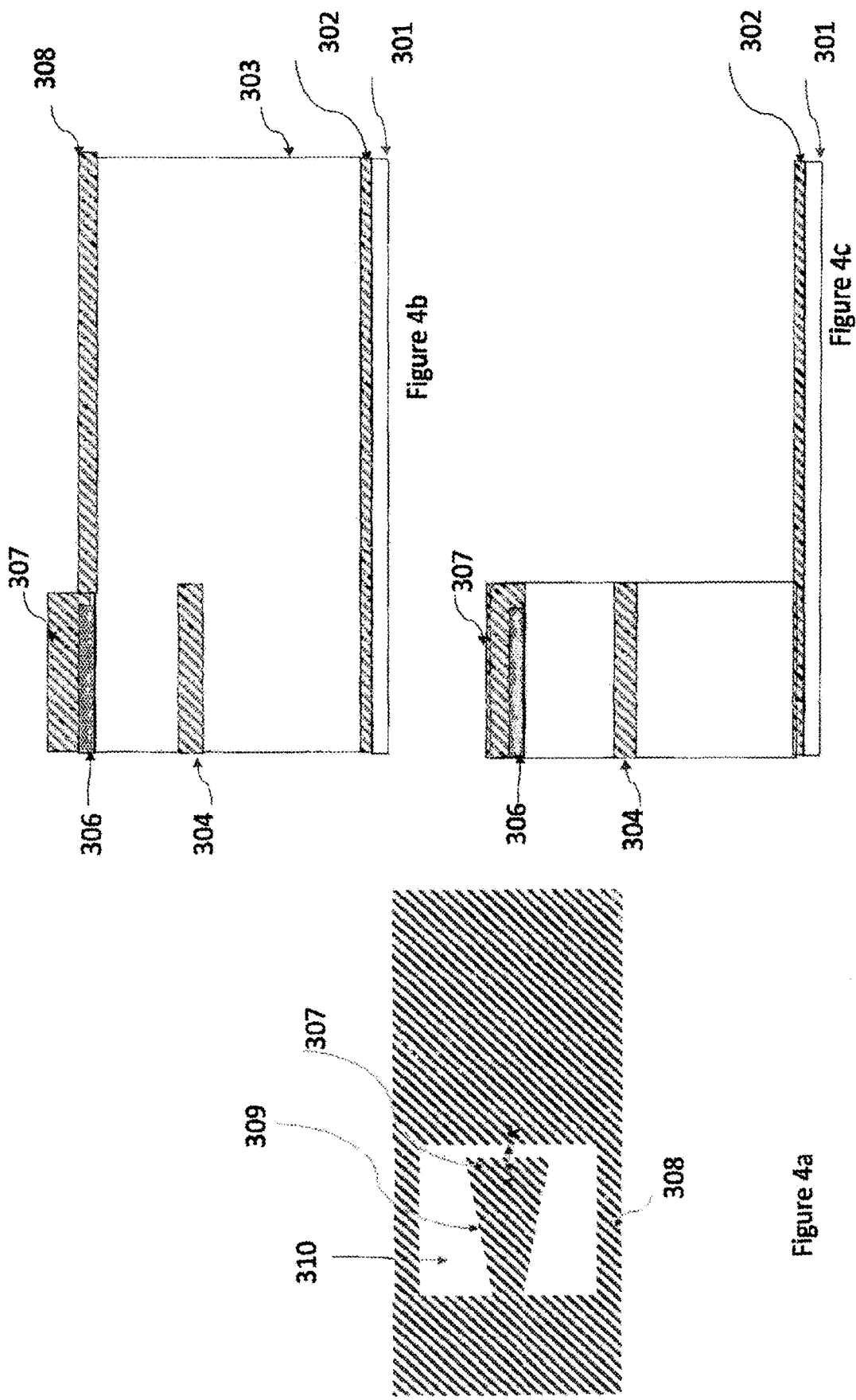

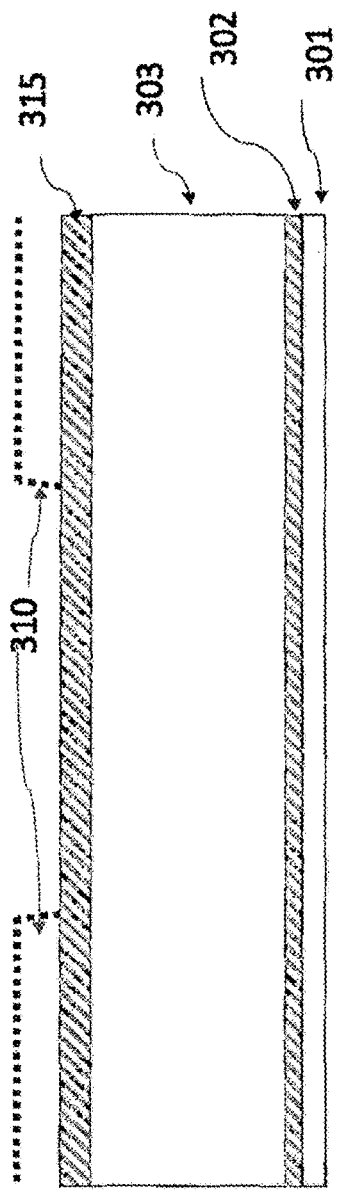
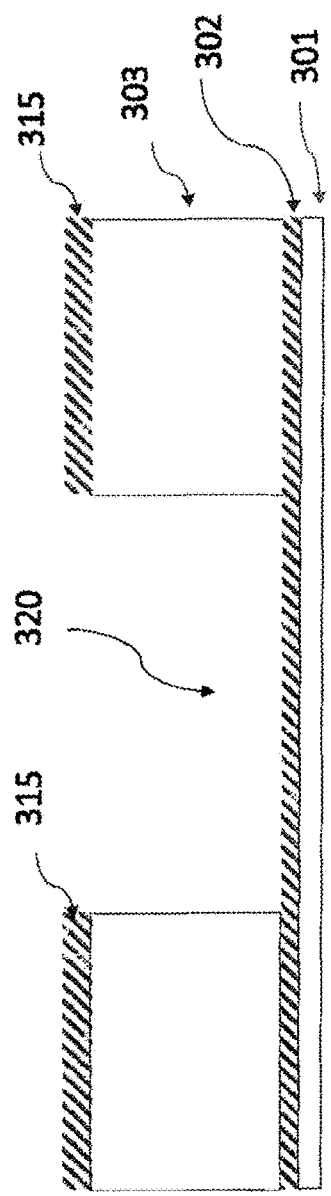
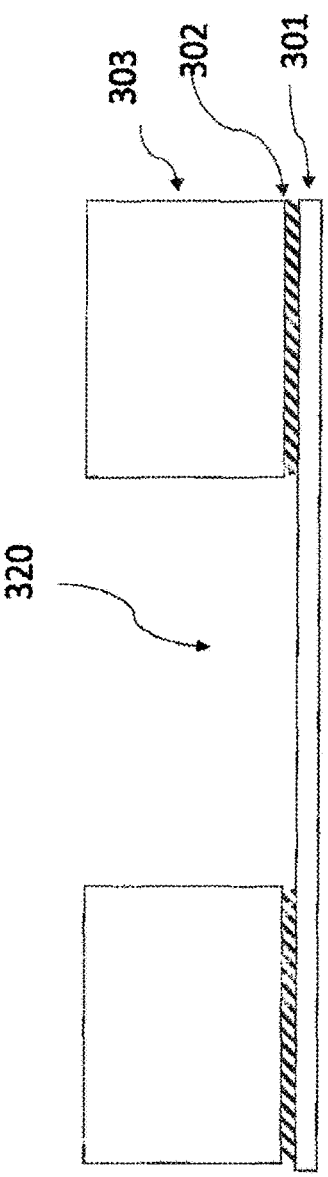
Figure 5a
Figure 5b
Figure 5c

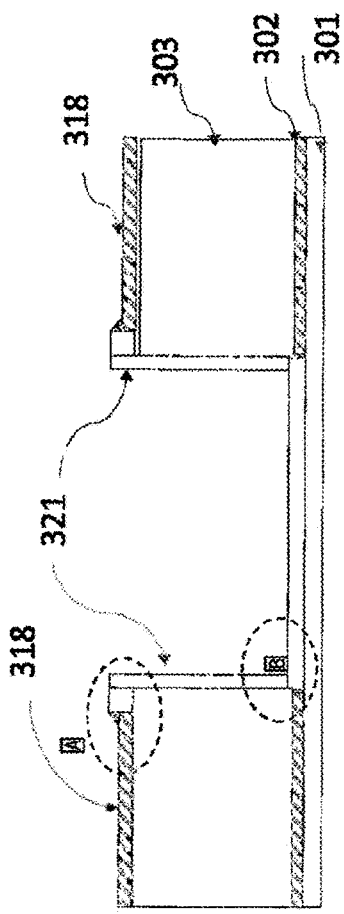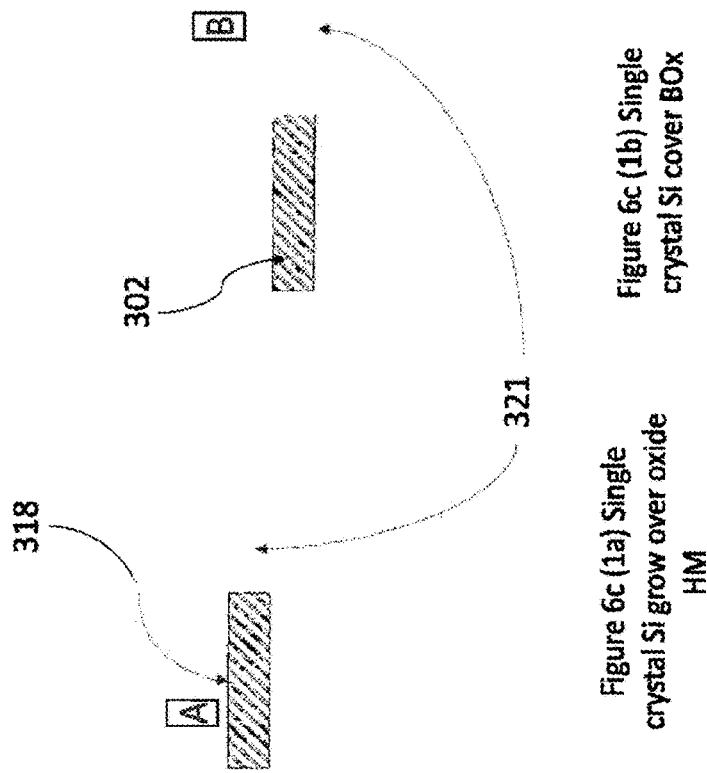
Figure 6c
Legend
Single crystal Si (SOI)
Single crystal Si by Selective EPI
Figure 6c (1a) Single crystal Si grow over oxide HM
Figure 6c (1b) Single crystal Si cover BOx

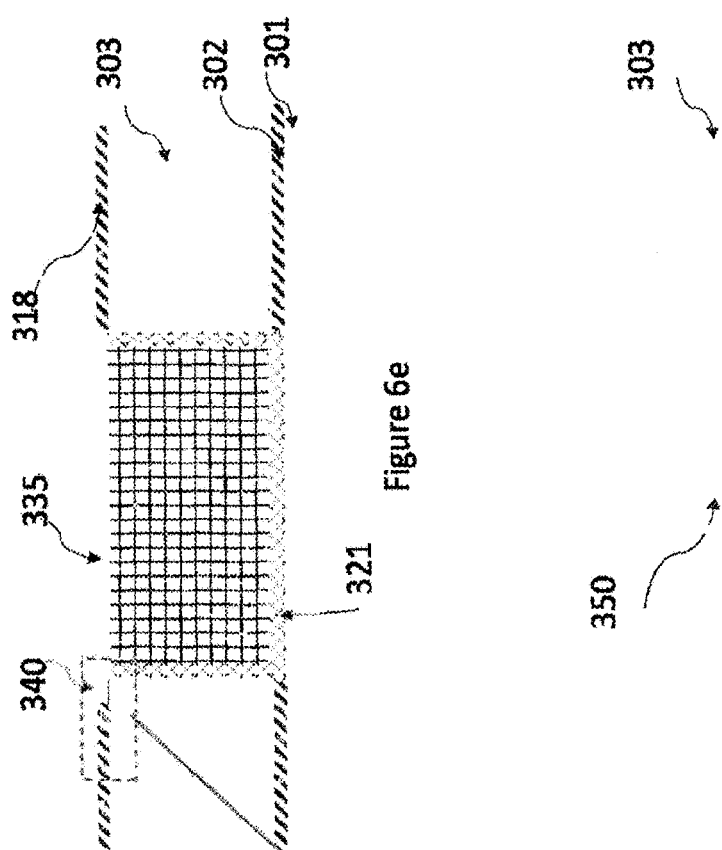
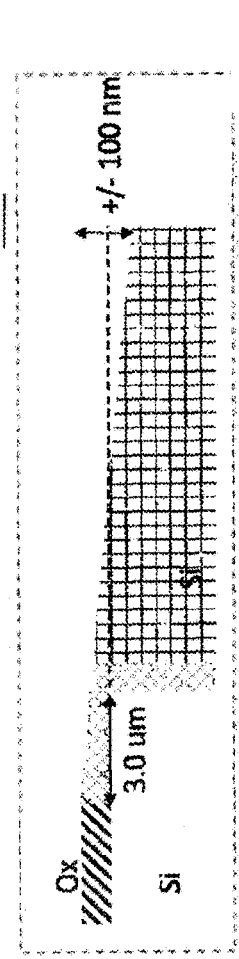
Figure 6e
Figure 6f

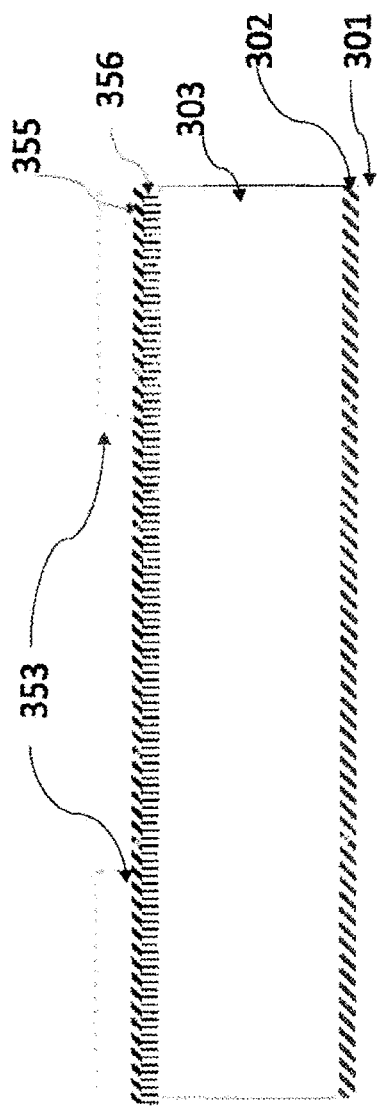
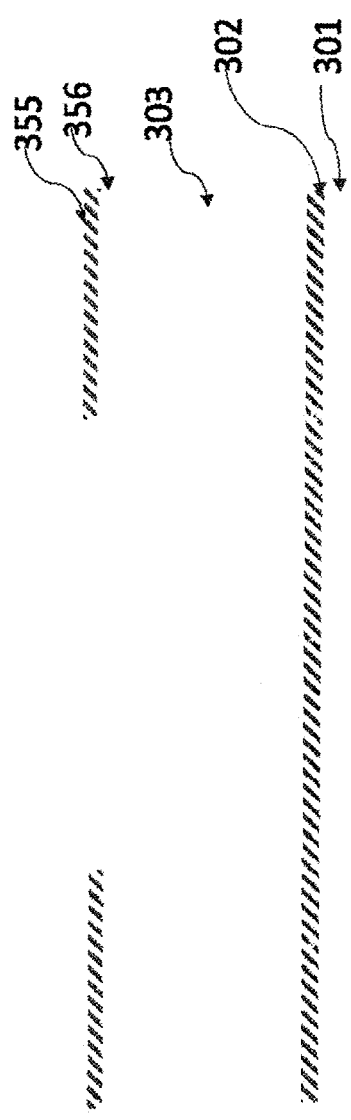
Figure 7a
Figure 7b

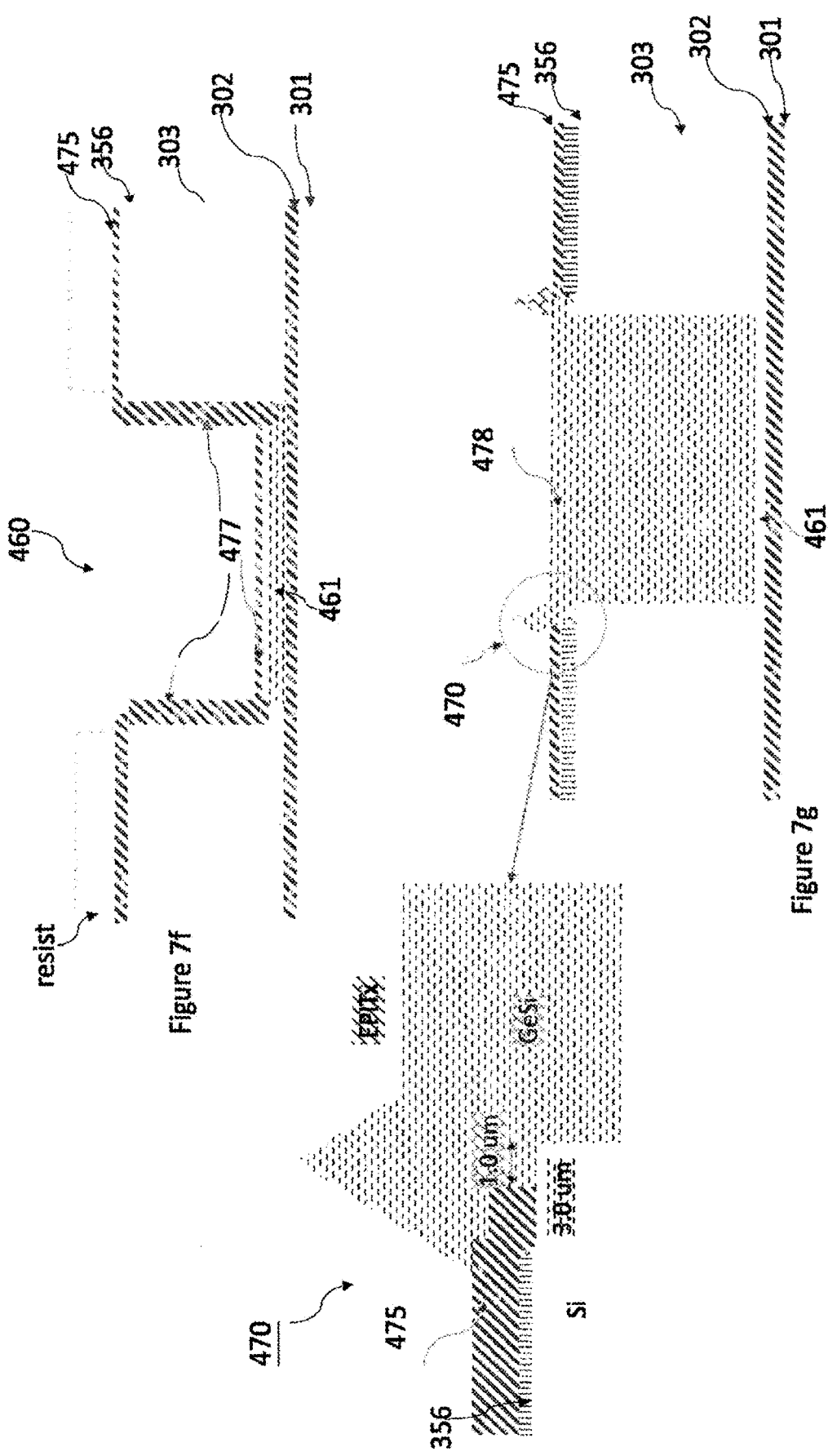

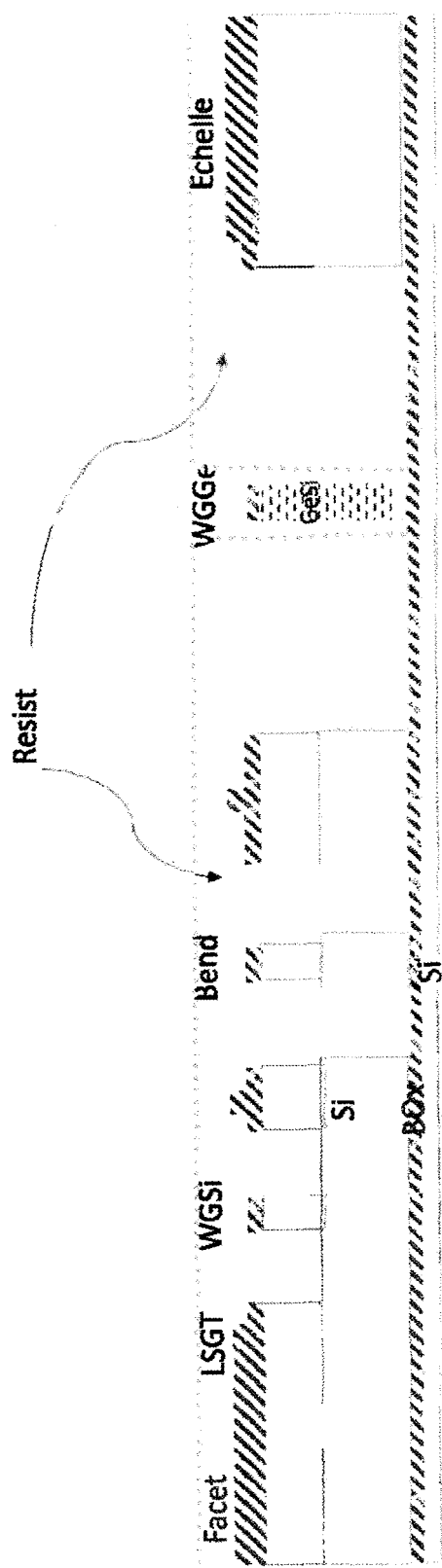
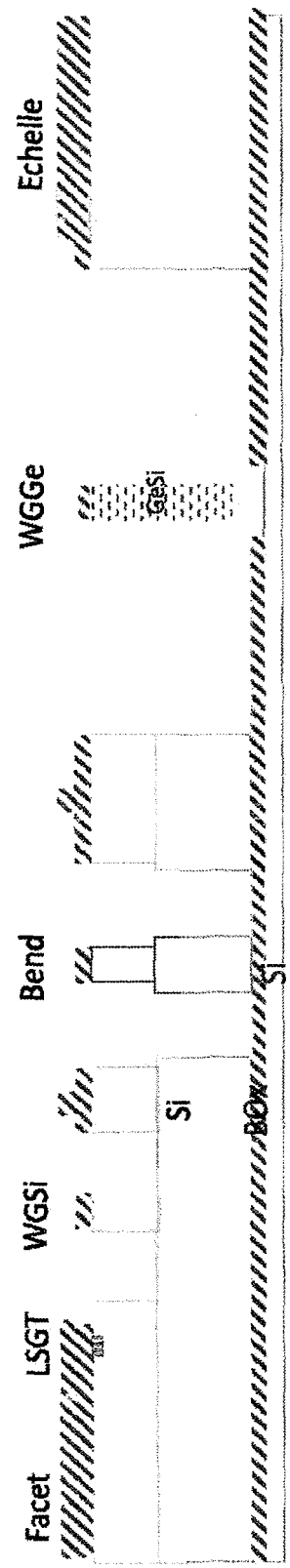
Figure 12a
Figure 12b

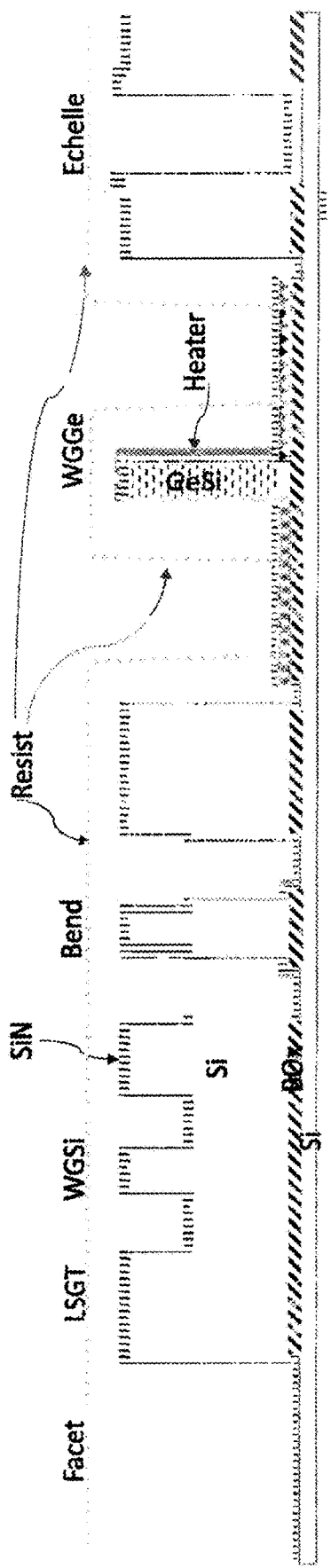
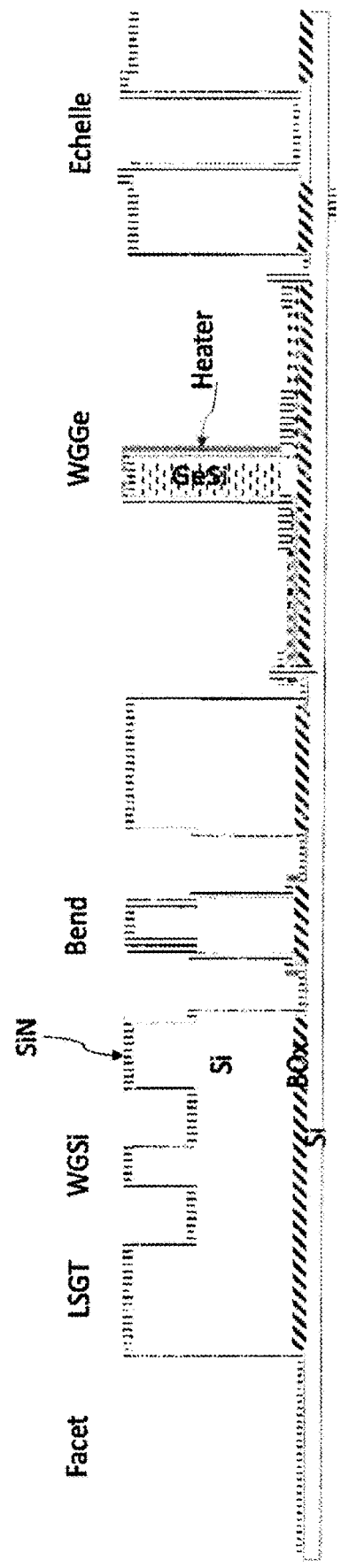
Figure 18a
Figure 18b

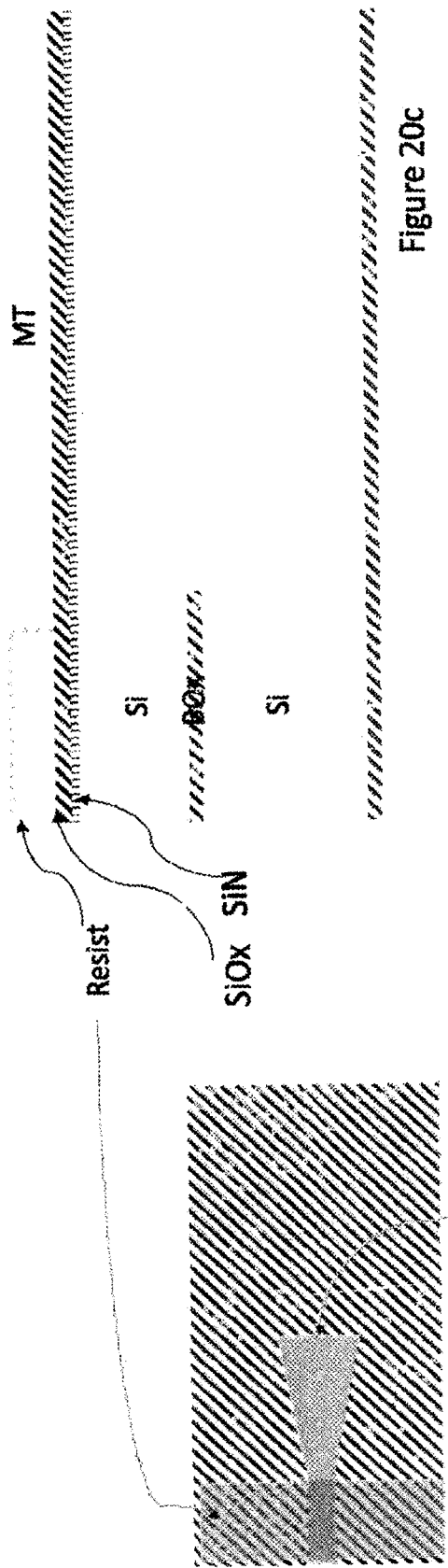
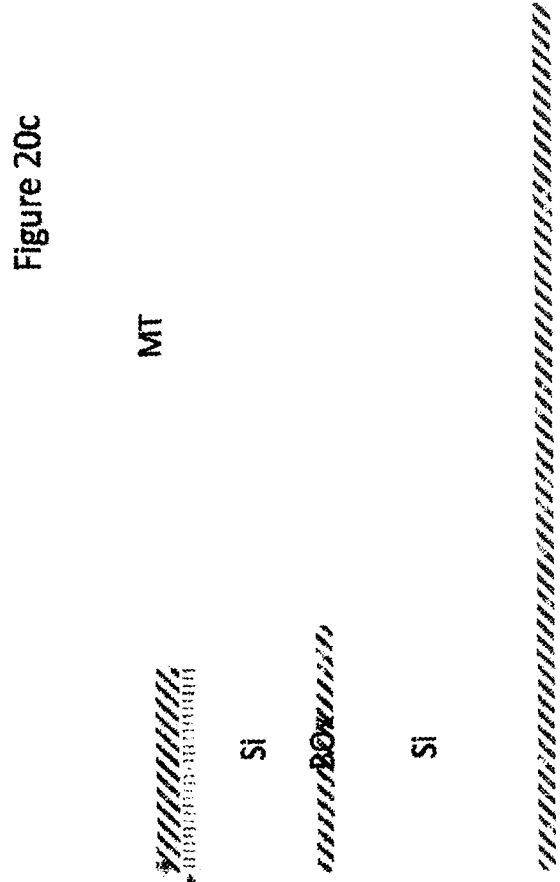
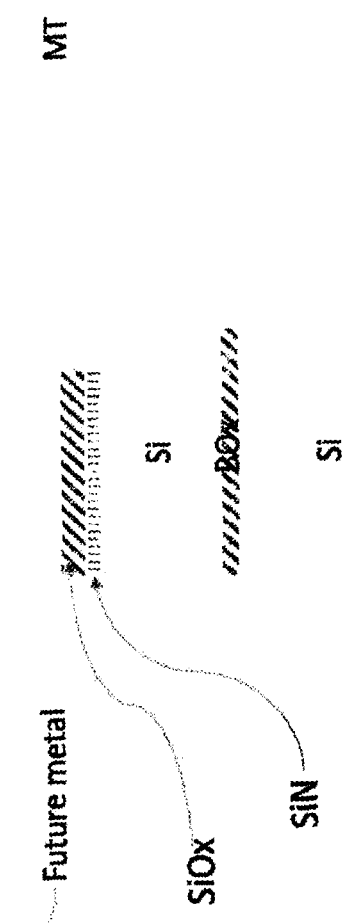
Figure 20b
Figure 20c
Figure 20d

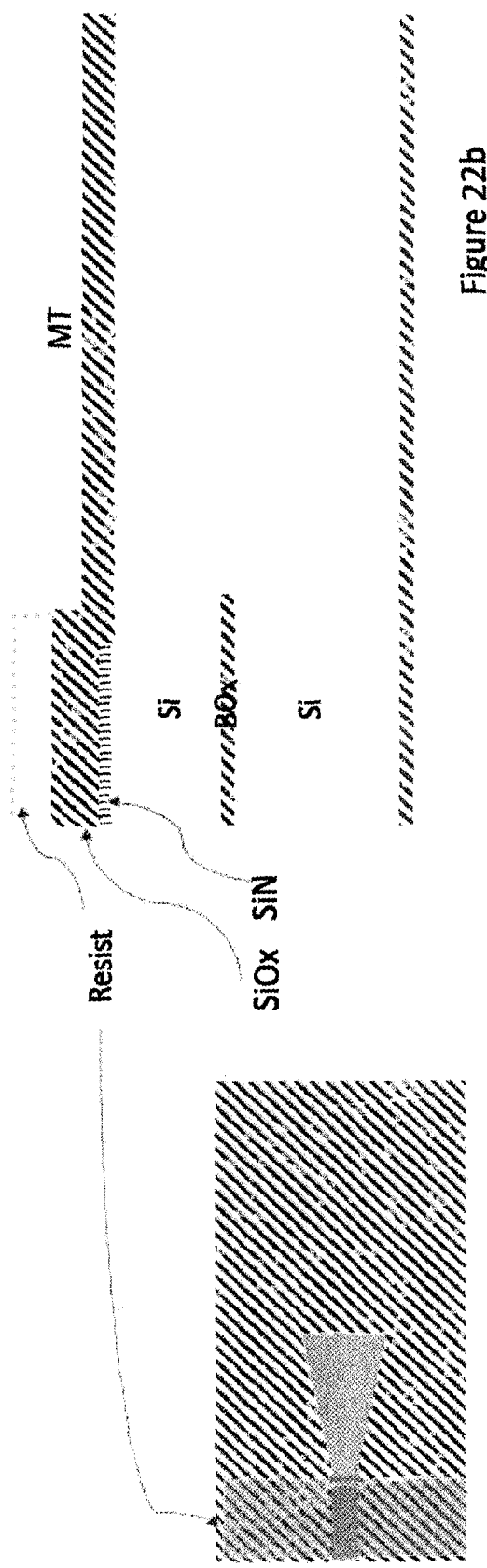
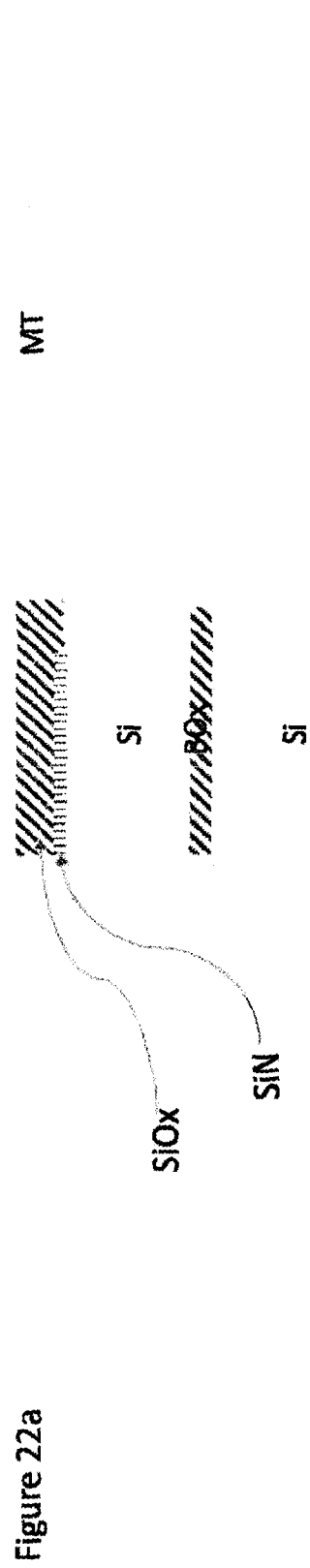
Figure 22a
Figure 22b
Figure 22c

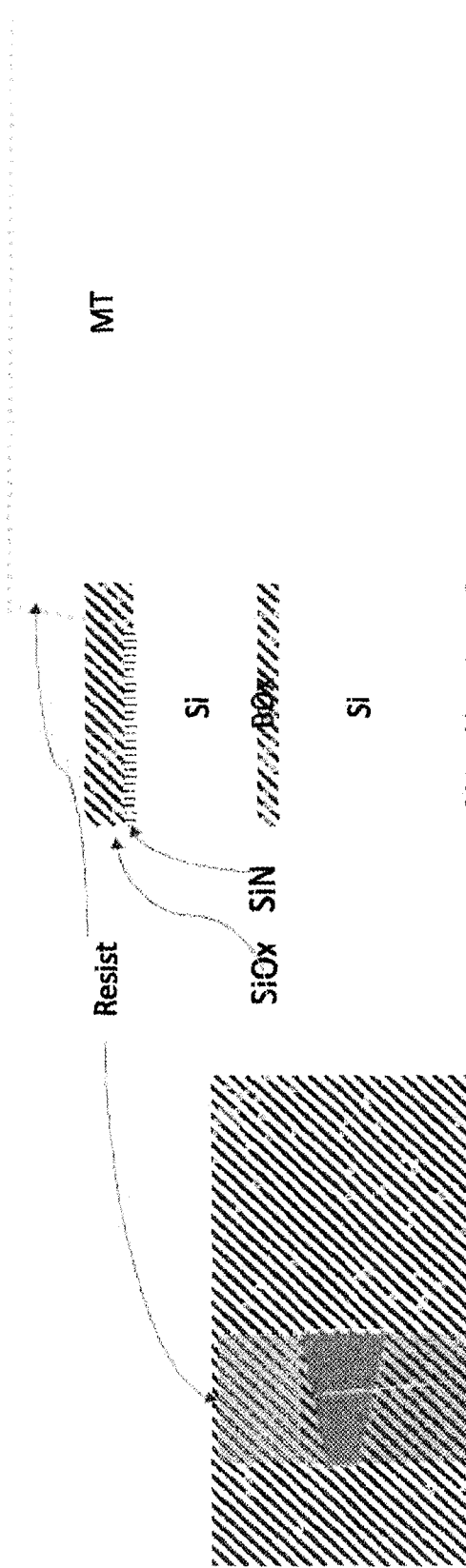
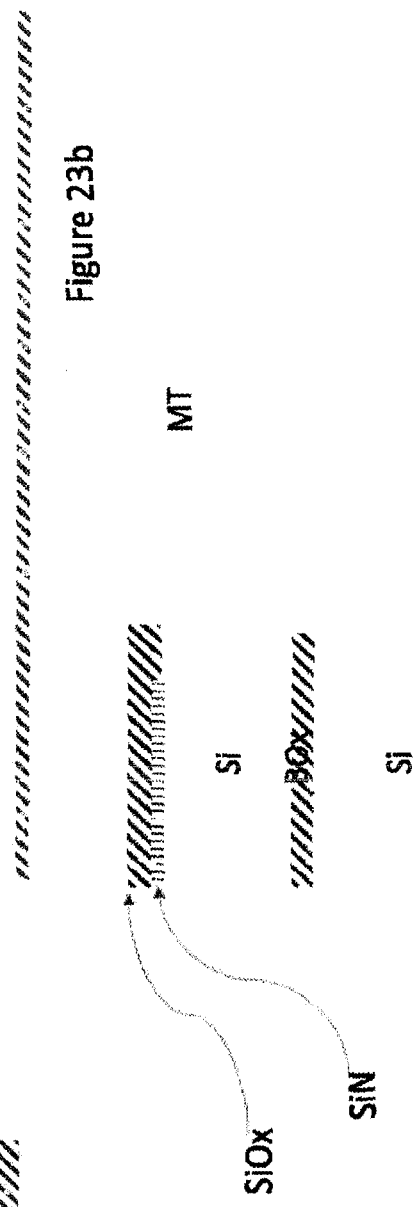
Figure 23a
Figure 23b
Figure 23c

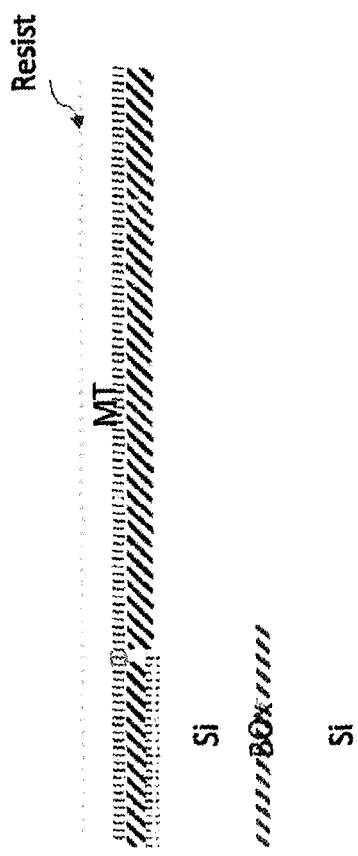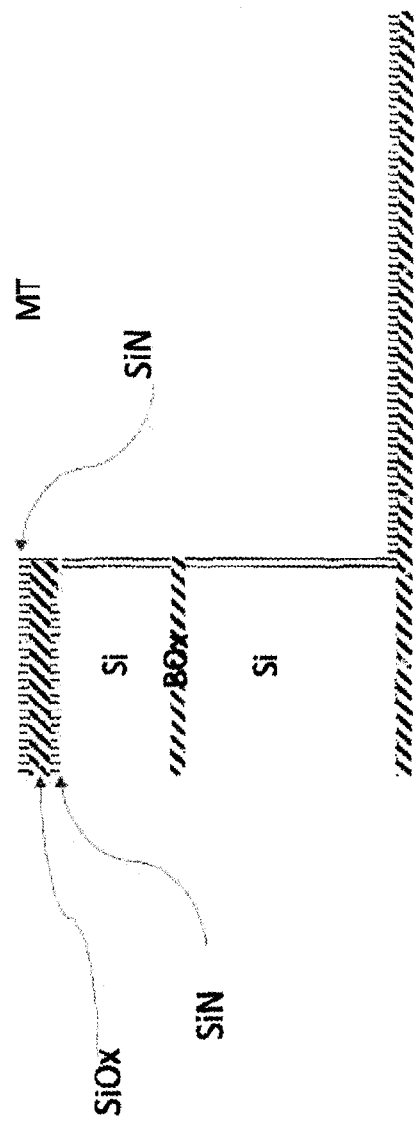
Figure 25a
Figure 25b

Mode Transfer Loss and Polarization Dependent Loss vs. Length for Linear and Nonlinear Tapers

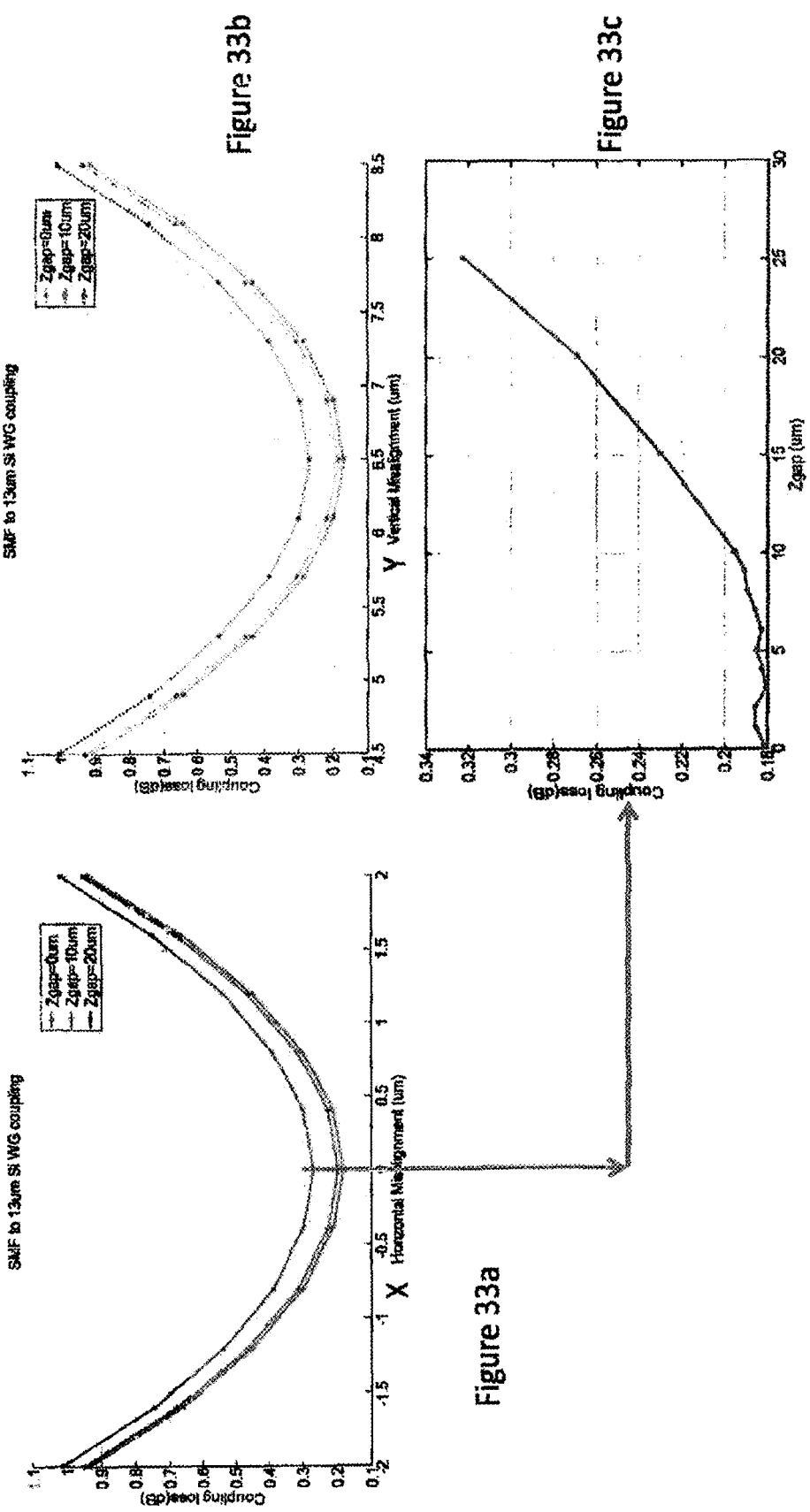

OPTICAL COUPLER

CROSS REFERENCE TO RELATED APPLICATIONS

This application claims the benefit of priority to the PCT application PCT/GR2020/000003, filed Jan. 2, 2020, which claims the benefit of U.S. Provisional Patent Application No. 62/788,116, titled "OPTICAL COUPLING" filed on Jan. 3, 2019, which is incorporated by reference herein in its entirety.

FIELD

Embodiments described herein relate to optical coupling structures, and more particularly for optical coupling between waveguide and optical fibers.

BACKGROUND OF THE INVENTION

Example embodiments generally relate to the field of photonics integrated circuits (PICs) lateral couplers. For example, an example embodiment provides a gradient-index (GRIN) waveguide lateral coupler.

Cloud computing, enterprise networks, and data center networks continue to drive increased bandwidth demand of optical fiber communication for metro and longhaul wires, and rack-to-rack wires within data centers to 100 Gbps and beyond. Optical fiber transmission systems using single mode fibers (SMFs) are commonly utilized for such high capacity communication systems. A common optical fiber transmission system includes a side (edge) emitting laser diode coupled with a single mode fiber. Various coupling structures have been proposed to increase coupling efficiency between a laser and a single mode fiber. Such commonly employed coupling structures include butt coupling (direct alignment of the optical paths of) the DFB laser with the SMF, or the integration of a cylindrical lens or combination of a cylindrical lens and graded index rod lens between the laser and waveguide, and similarly between a waveguide and SMF. However, these systems have their disadvantages of being bulky and high assembly cost.

Technologies for producing compact optical communication systems are available using complementary metal-oxide-semiconductor (CMOS) compatible processes, for example, in the form of Photonic ICs (PIC). Efficient coupling between a PIC waveguide and an external optical fiber, however, can be a major challenge due to a modal mismatch at the waveguide-optical fiber interface. The modal mismatch of coupling between waveguides and external optical fibers especially can be a larger challenge when the optical fiber is outside the plane of the waveguide (e.g., when the waveguide-optical fiber interface is not perpendicular to the direction of propagation defined by the waveguide), due to the guided nature of the waveguide modes. Currently, grating couplings are generally used to couple out-of-plane optical fibers to waveguides. For example, grating couplings are generally used as waveguide lateral couplers. Grating couplings however, can be difficult to design and manufacture and generally result in a significant loss of beam power.

Therefore, a need exists in the art for improved methods, devices, and/or the like for coupling PIC waveguides to external optical fibers for a more compact and efficient device to replace current interconnect optical couplers.

SUMMARY

Example embodiments provide optical interconnect devices and methods for manufacturing devices. Various example embodiments provide a universal coupler, a method for making the universal coupler for mode transfer to an external optical fiber, and/or the like.

An optical interconnect device connecting a laser output to an external optical fiber is disclosed. The interconnect device is built on the top surface of a substrate. The optical interconnect device includes a laser cavity module transmitting a light beam from a laser along a first direction; an optical modulator module transmitting the light beam along the first direction, wherein the light beam has a first spot size; a mode transfer module comprising a tapered structure, disposed after the optical modulator module along the first direction, and universal coupler to control a propagating direction of the light beam, wherein the tapered structure expands the first spot size of the light beam to a second spot size, wherein the second spot size is larger than the first spot size; and an external optical fiber attached to a surface lens, wherein the surface lens receives the expanded light beam from the universal coupler and focuses the light beam to the external optical fiber.

Optionally, the tapered structure changes its cross-sectional size linearly.

Optionally, the tapered structure changes its cross-sectional size non-linearly.

In one exemplary embodiment, the external optical fiber is disposed along the first direction, and the universal coupler is an in-plane coupler to transmit the expanded light beam into the in-plane placed external optical fiber.

In another exemplary embodiment, the external optical fiber is disposed along a second direction perpendicular to the first direction, and the universal coupler is a vertical coupler configured to reflect the expanded light beam into a second direction perpendicular to the first direction.

Optionally, the optical modulator module is a Franz Keldysh (or FK) Modulator comprising a waveguide and GeSi channels in the waveguide.

Optionally, the expanded second spot size of the light beam after the universal coupler matches a diameter of a core of the external optical fiber.

Optionally, the external optical fiber is a single mode optical fiber.

Optionally, the second light spot is at least two times as large as the first light spot.

Optionally, the optical modulator module has an antireflective coating.

Another embodiment discloses a method of fabricating an optical interconnect apparatus, the method includes initially providing a Si substrate which has a top surface where the optical interconnect apparatus is built upon and a bottom surface having an embedded layer of oxide. The method further includes fabricating a laser cavity, an optical modulator module next to the laser cavity, and a mechanical transfer module, all sequentially disposed along the same direction. The laser cavity module is configured to transmit an in-plane laser light, the optical modulator module connects to the laser cavity module, and the mechanical transfer module has a tapered structure for expanding the in-plane laser light to a larger beam spot, and a universal coupler to control a propagating direction of the laser light into an external single mode optical fiber. Then the laser cavity module, the optical modulator module and the mechanical transfer module are packaged into an integrated optical interconnect system. Finally, the laser and the integrated optical interconnect system are assembled with the surface lens and the external single mode optical fiber.

One method includes forming the universal coupler configured to transmit the expanded light beam into the external optical fiber along the first direction when the external optical fiber is placed along the first direction.

Another method includes forming the universal coupler into a sloped mirror structure next to the tapered structure, in the case when the external single mode optical fiber is perpendicularly placed to the first direction. The sloped mirror structure is configured to change the direction of laser light coming from the tapered structure by 90 degrees into the surface lens and the external single mode optical fiber, and the sloped mirror structure is coated with a high reflective metal material.

Optionally, the tapered structure changes its cross-sectional size linearly.

Optionally, the tapered structure changes its cross-sectional size non-linearly.

Optionally, fabricating the laser cavity module includes patterning a plurality of in-plane laser gratings and depositing SiN and SiOx layers on the plurality of in-plane grating structures.

Optionally, fabricating the optical modulator module includes steps of forming silicon modulator structures, depositing a silicon oxide layer in a first sub-area of the optical module area on the top surface of the Si substrate: patterning the silicon modulator structures in the first sub-area of optical module area, exposing the embedded layer of oxide of the bottom surface of the silicon substrate; performing selective epitaxial growth of silicon on walls of trenches in the first sub-area of the optical module area; performing non-selective epitaxial growth of silicon on top of the selective epitaxial silicon to overfill the trenches the first sub-area; performing CMP on the trenches, wherein the CMP is controlled to expose the silicon oxide layer outside the trenches and leave a predetermined dishing depth inside the trenches; and annealing the optical module area.

Optionally, forming the optical module further includes steps of forming germanium modulator structures, depositing a silicon nitride layer in a second sub-area of the optical module area; depositing a silicon oxide layer on the silicon nitride in the second sub-area of optical module area; patterning the germanium modulator structures in the second sub-area of the optical module area, wherein the patterning exposes the embedded layer of oxide on the bottom surface of the Si substrate inside trenches; performing selective epitaxial growth of silicon on walls of the trenches in the second sub-area of the optical module area; performing selective epitaxial growth of mixed silicon and germanium on the selective epitaxial silicon on walls of the trenches in the second sub-area of the optical module area; performing non-selective epitaxial growth of mixed silicon and germanium on top of the selective epitaxial silicon to overfill the trenches; performing CMP on the trenches, wherein the CMP is controlled to expose the silicon oxide layer outside the trenches and leave the predetermined dishing depth inside the trenches; and finally annealing the optical module area.

Optionally, forming the germanium modulator structures in the second sub-area of the optical module area further includes patterning the germanium modulator structures to be spaced apart from walls of the trenches; depositing polysilicon in the space next to the germanium modulator structures; doping N++ at one side of each of the germanium modulator structures by implanting N-type ions; doping P++ at another side of said germanium modulator structures by implanting P-type ions; and annealing the polysilicon.

Optionally, the method further includes patterning a waveguide structure in the first and second sub-areas of the optical module area, a facet structure in front of the laser cavity module; an optical bend structure next to the silicon modulator structures; and an Echelle grating structure next to the germanium modulator structures, wherein the Echelle grating structure is patterned to have a metal layer on facing side surfaces.

Optionally, the method also includes pattering a heater later at one side of said germanium modulator structurers.

Optionally, the method also includes pattering contact structures at both sides of each of the germanium modulator structurers and patterning pad structures for external connections.

The method in forming the mechanical transfer module includes patterning the tapered structure in an opening in the silicon substrate, the tapered structure has an increasing cross-sectional size along the direction of the waveguide; depositing oxide over the tapered structure; patterning the tapered structure in an opening in the silicon substrate, wherein the tapered structure increases its cross-sectional size gradually along the direction of the waveguide; depositing oxide over the tapered structure; and forming the universal coupler configured to transmit the expanded light beam into the external optical fiber along the first direction in a case when the external optical fiber is placed along the first direction; forming the universal coupler as a sloped mirror structure next to the tapered structure, in a case when the external single mode optical fiber is perpendicularly placed to the first direction, wherein the sloped mirror structure is configured to change the direction of laser light coming from the tapered structure by 90 degrees into the surface lens and the external single mode optical fiber, and wherein the sloped mirror structure is coated with a high reflective metal material.

Optionally, the waveguide and the tapered structure are deposited with an antireflective coating.

Another embodiment of the disclosure includes: patterning the vertical coupler: disposing a first photoresist over both the part in front of the taper and in the taper area, wherein the photoresist covers the area outside the gap between the VT and the MT using a gray tone mask to protect the area outside the VT, and a second photoresist that patterns the Si between the VT and the MT, creating a high-quality vertical facet with low roughness at the front side of the taper.

BRIEF DESCRIPTION OF THE DRAWINGS

Figure 1:
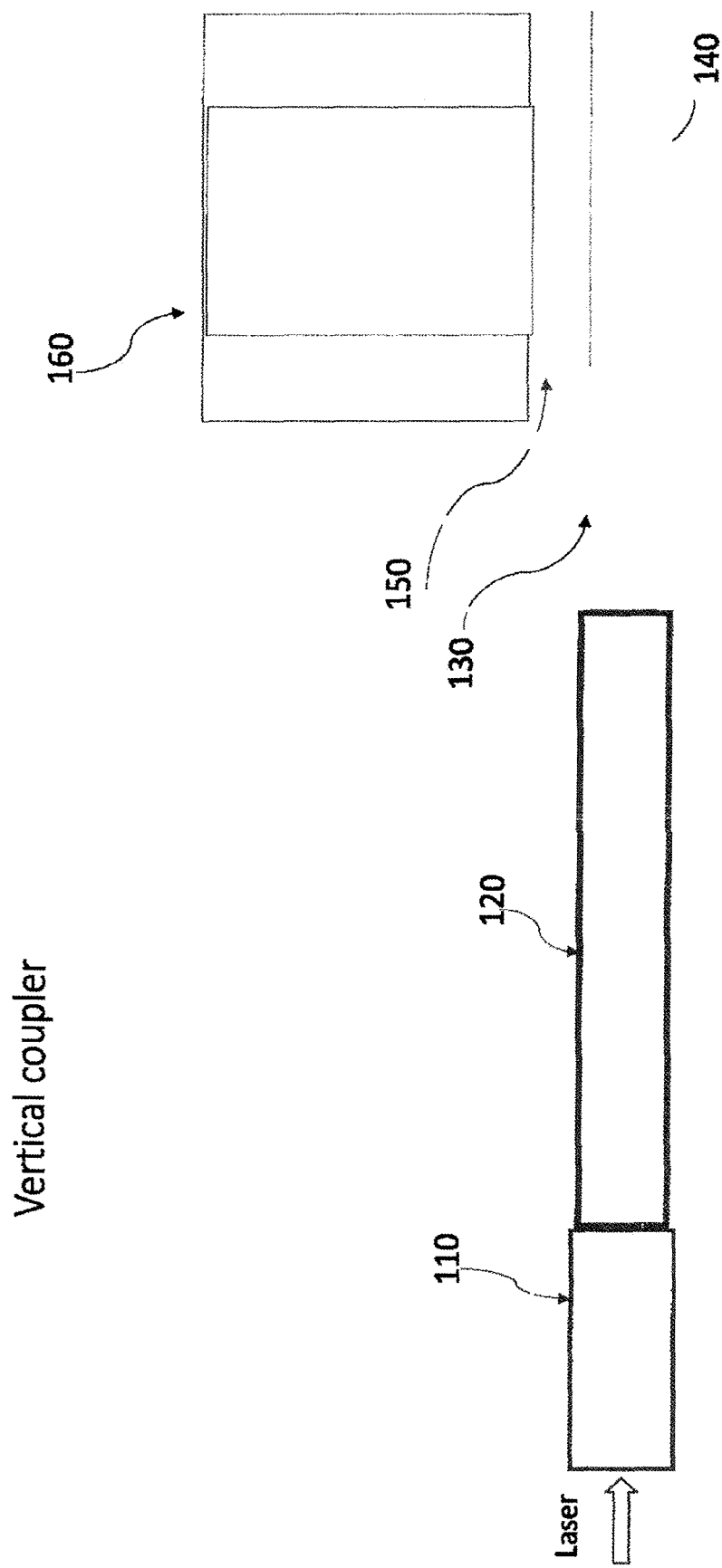
Figure 2:
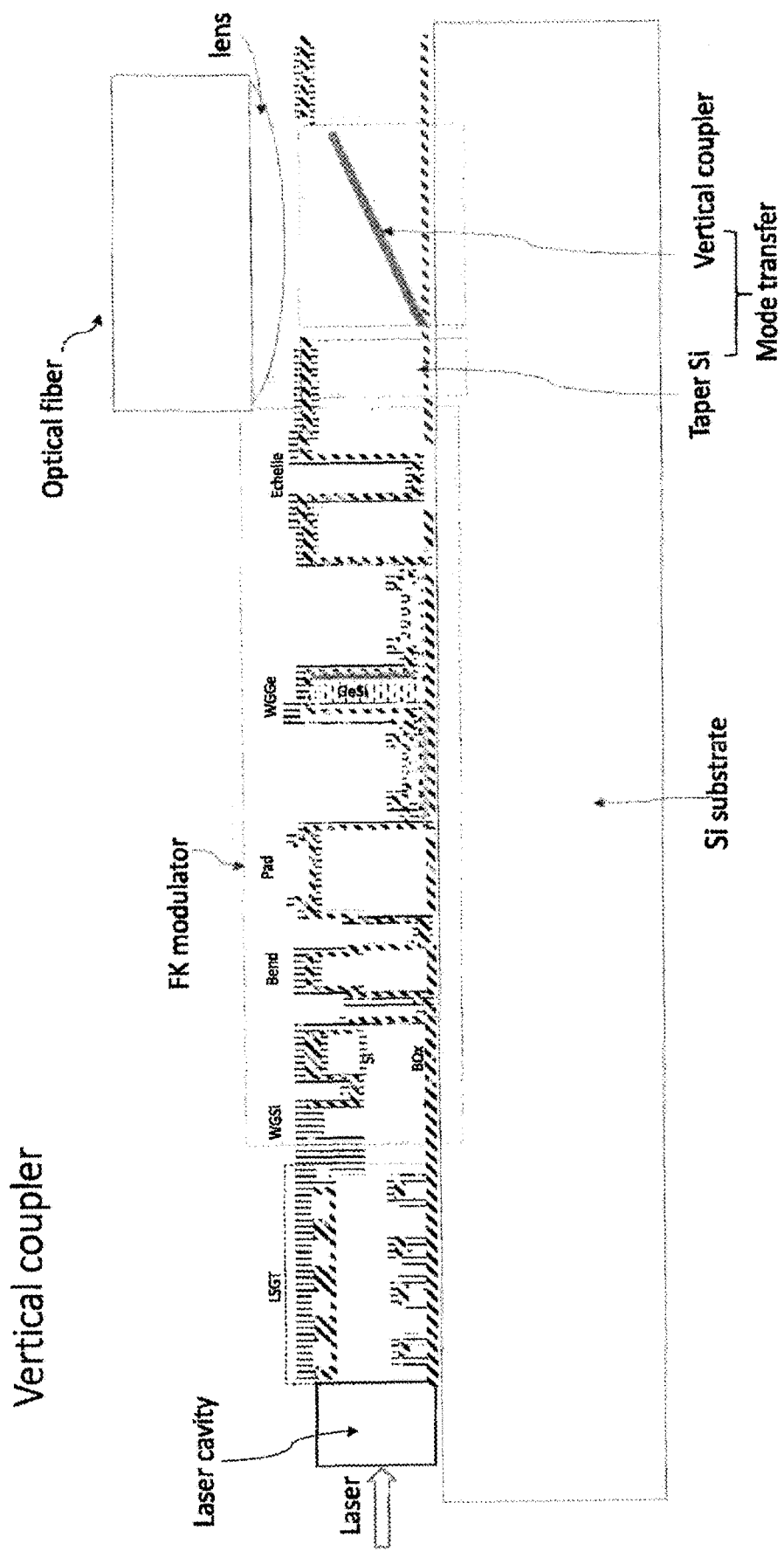
Figure 3:
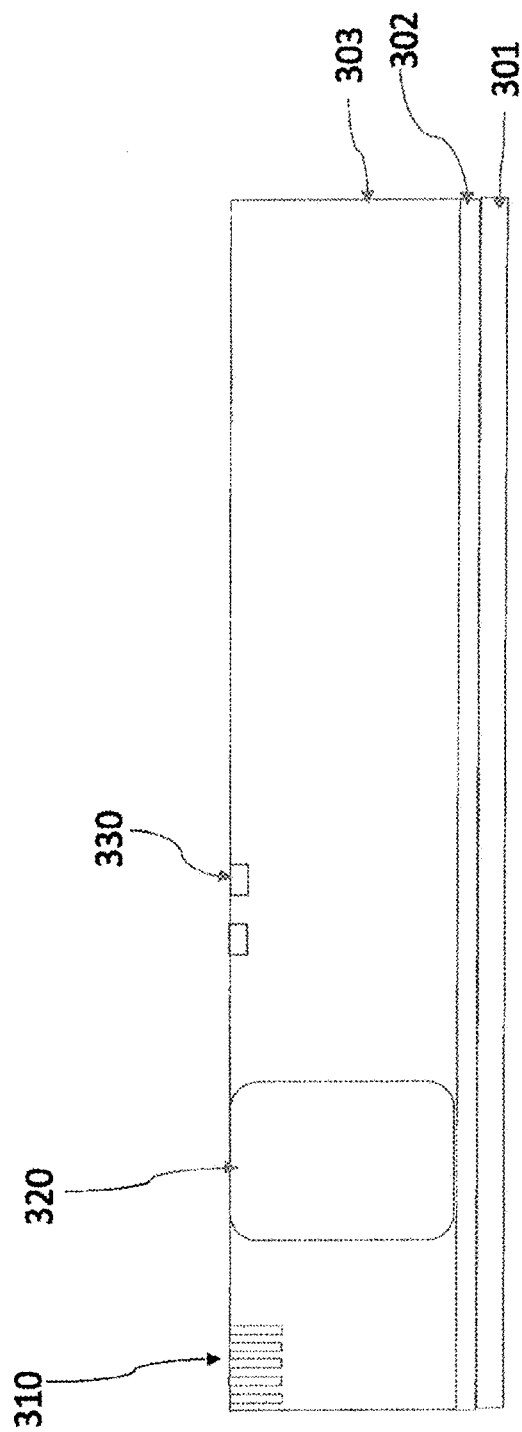
Figure 8:
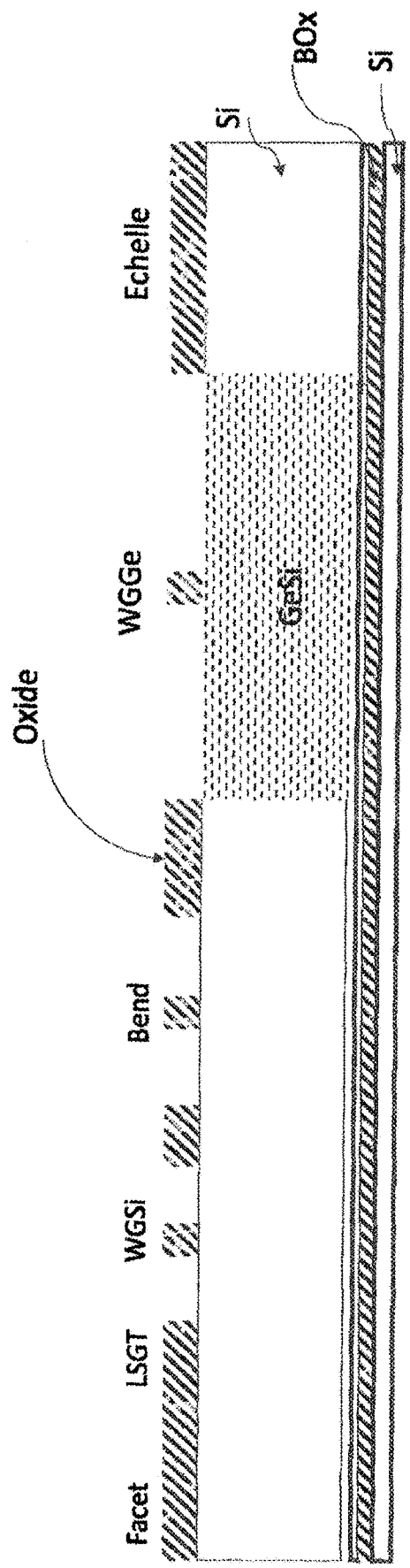
Figure 9A:
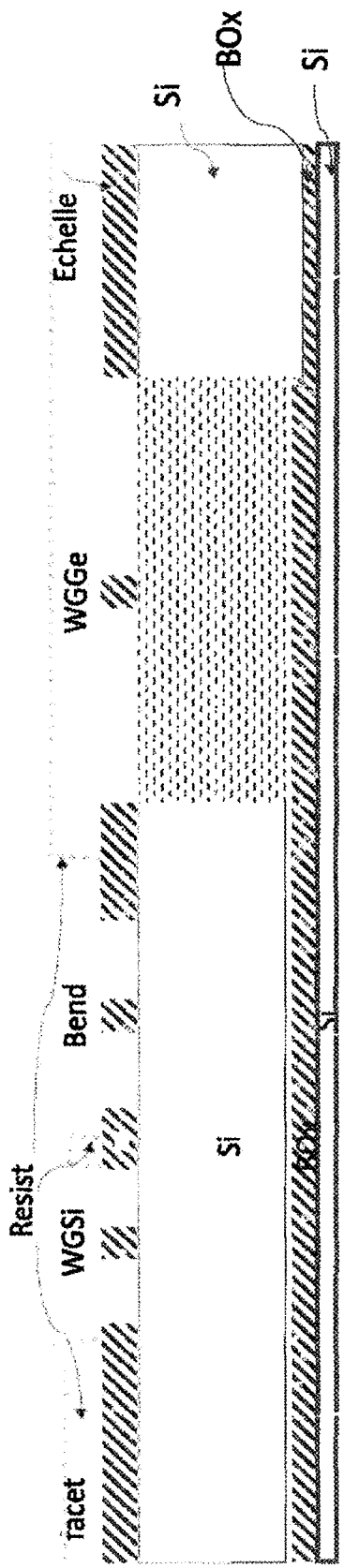
Figure 9B:
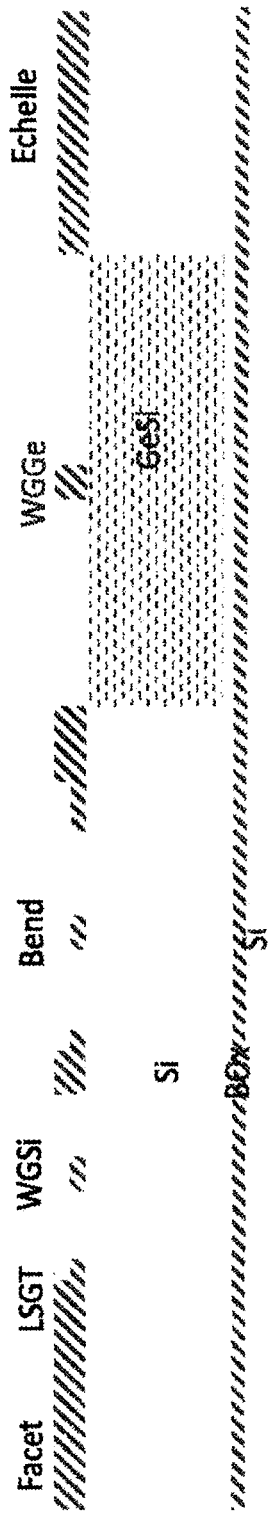
Figure 10:
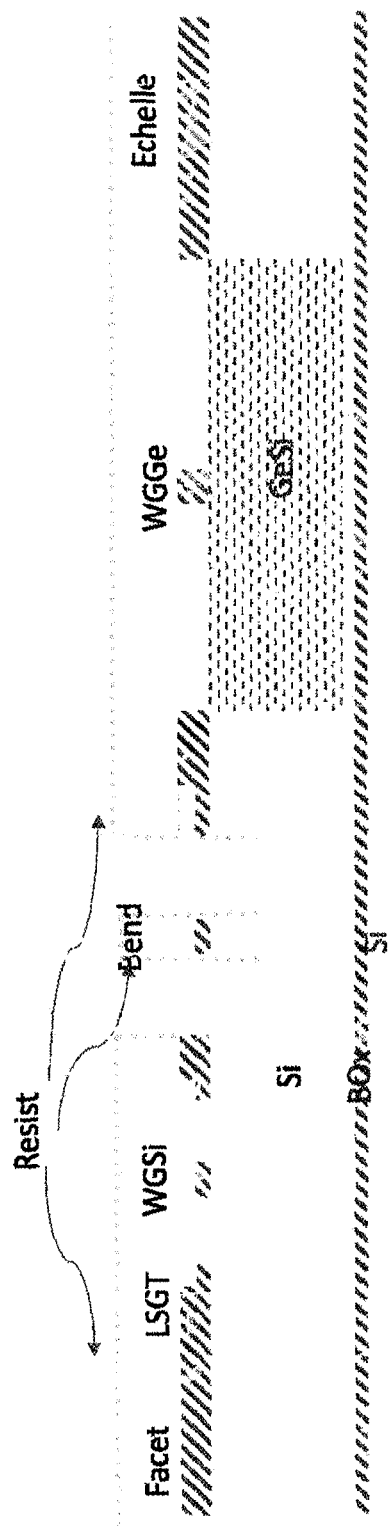
Figure 11:
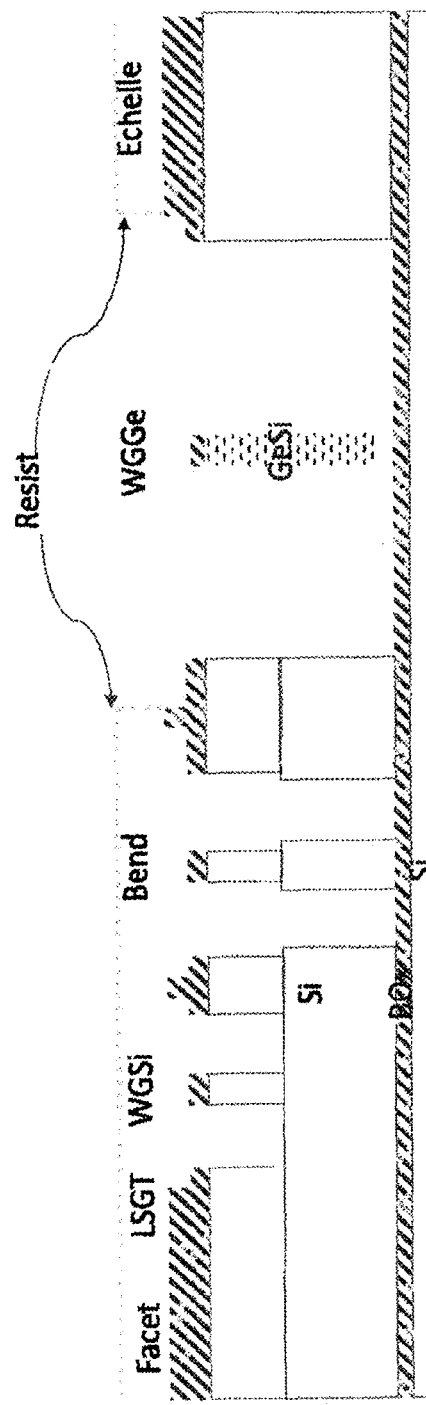
Figure 13A:
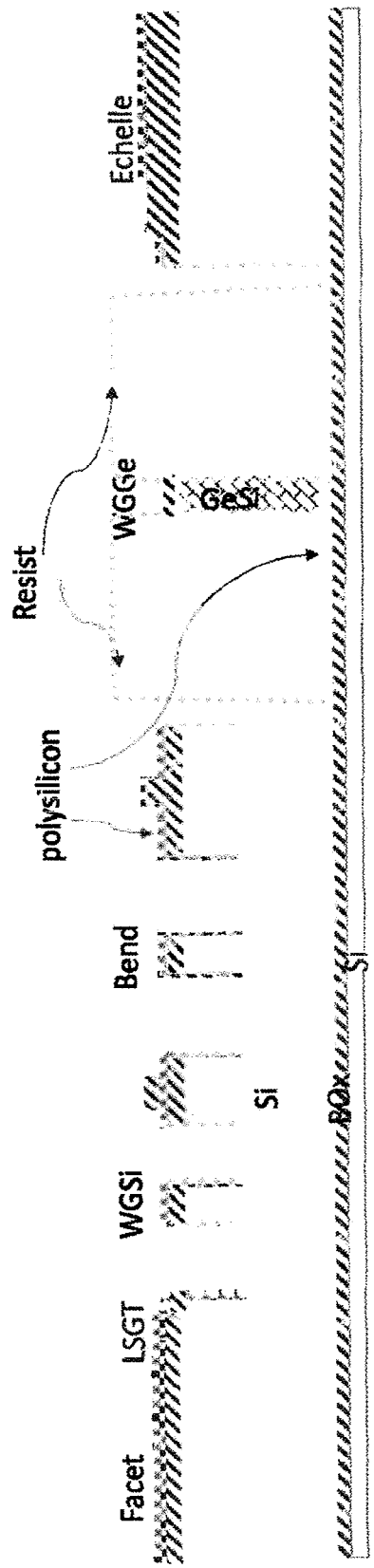
Figure 13B:
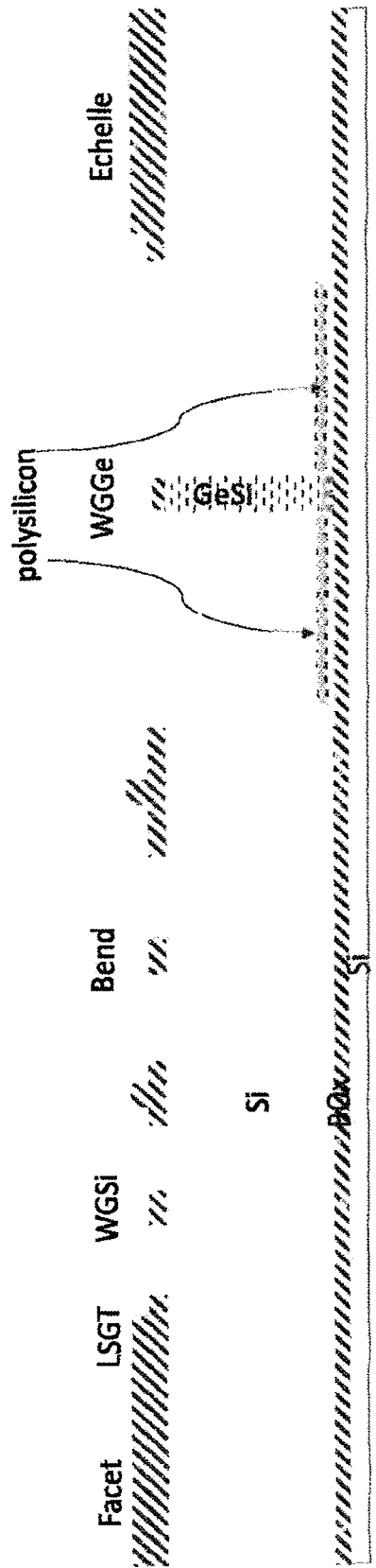
Figure 14A:
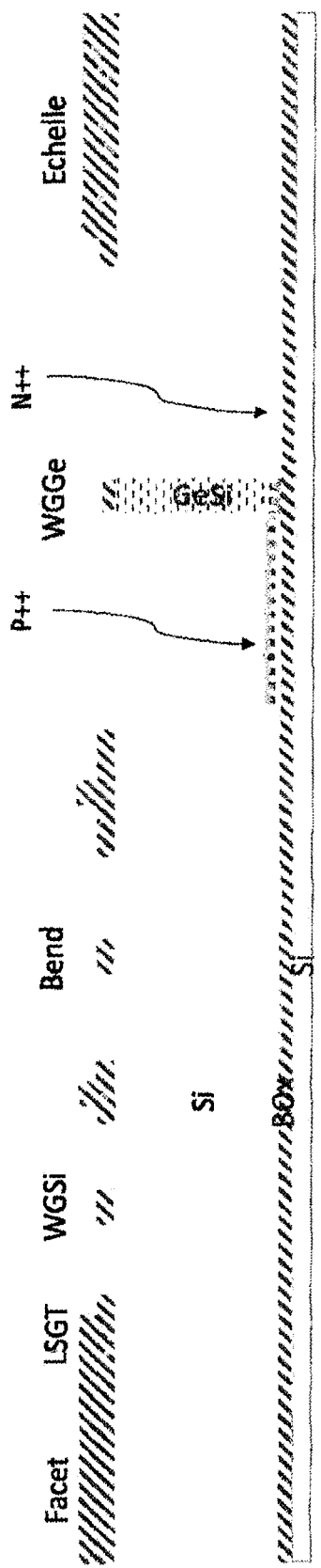
Figure 14B:
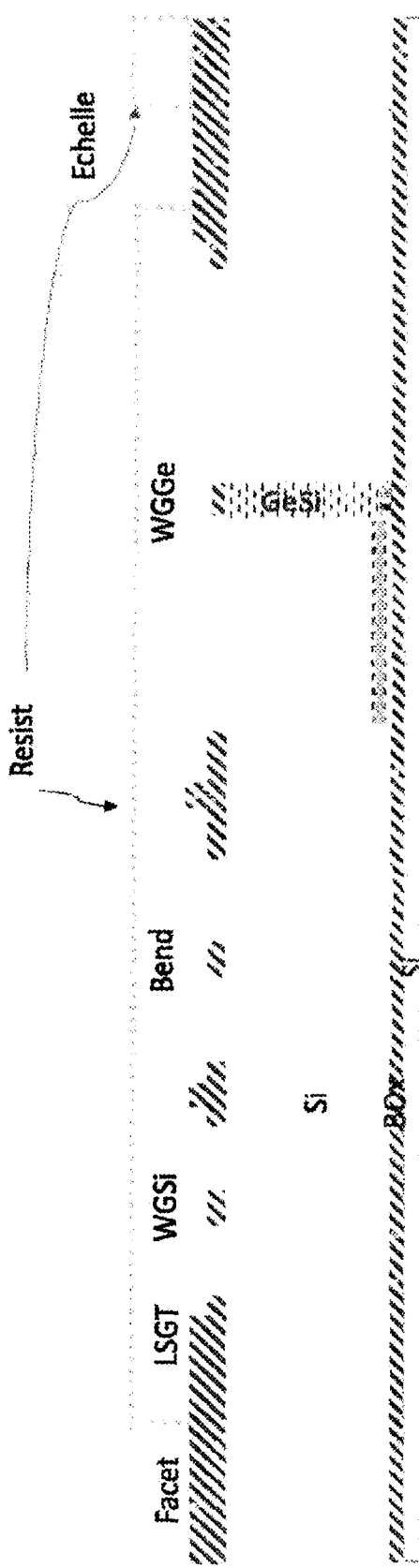
Figure 14C:
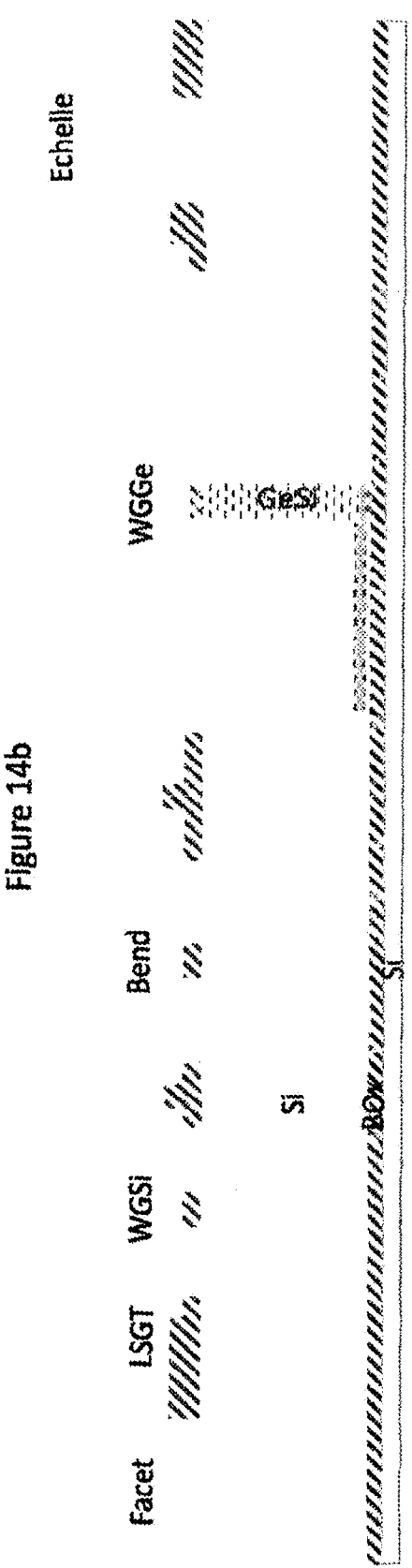
Figure 15A:
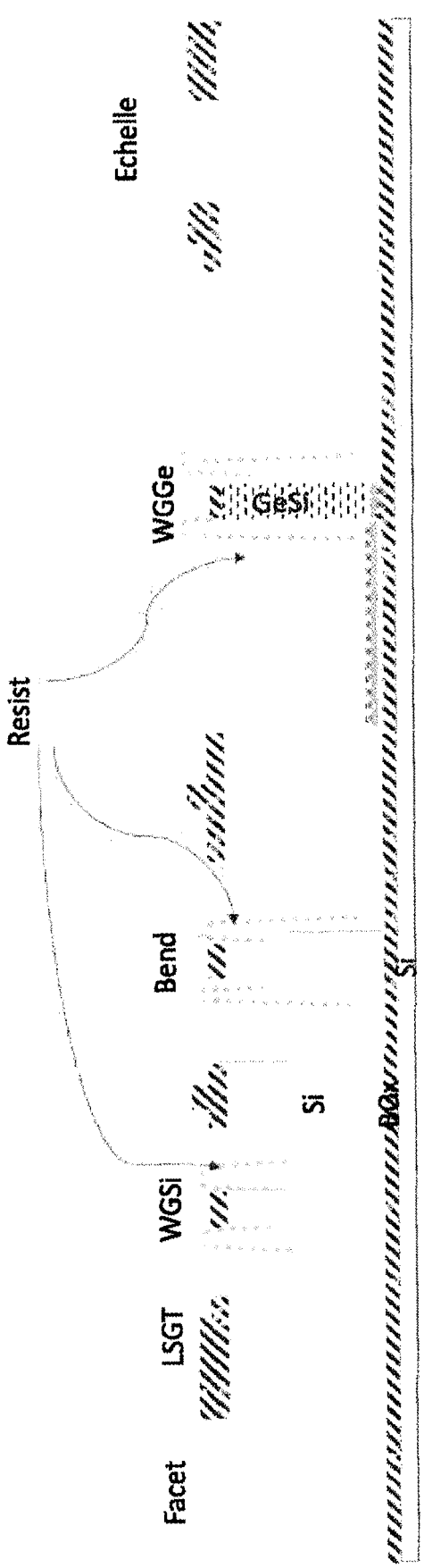
Figure 15B:
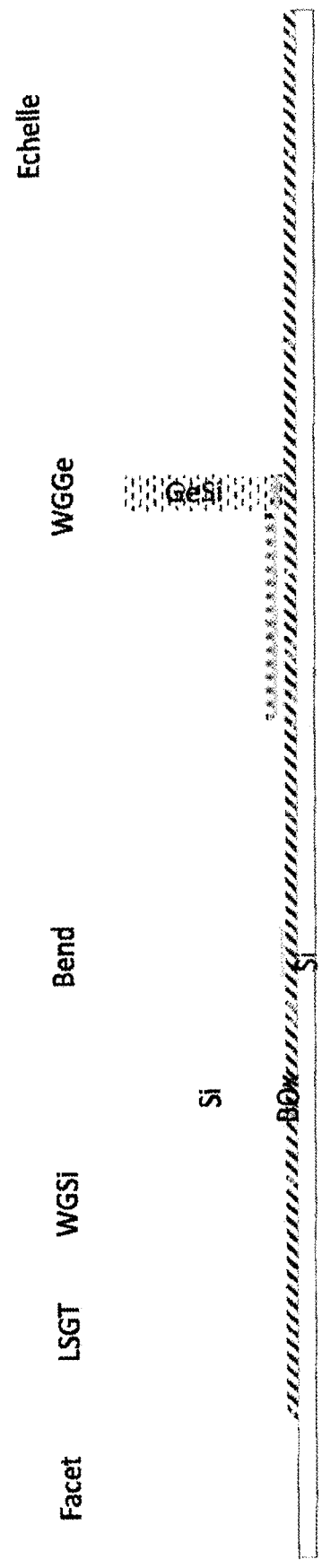
Figure 16A:
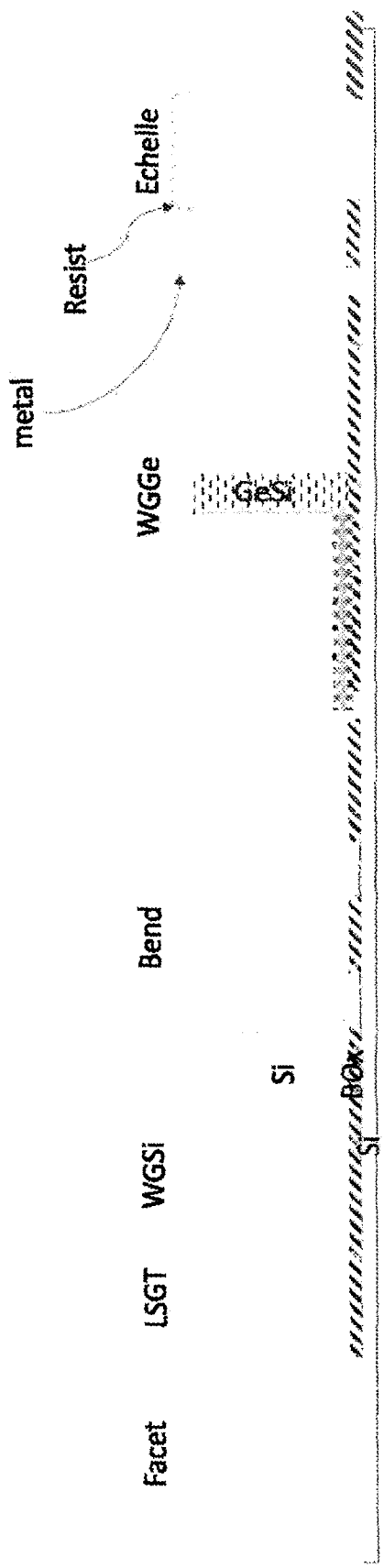
Figure 16B:
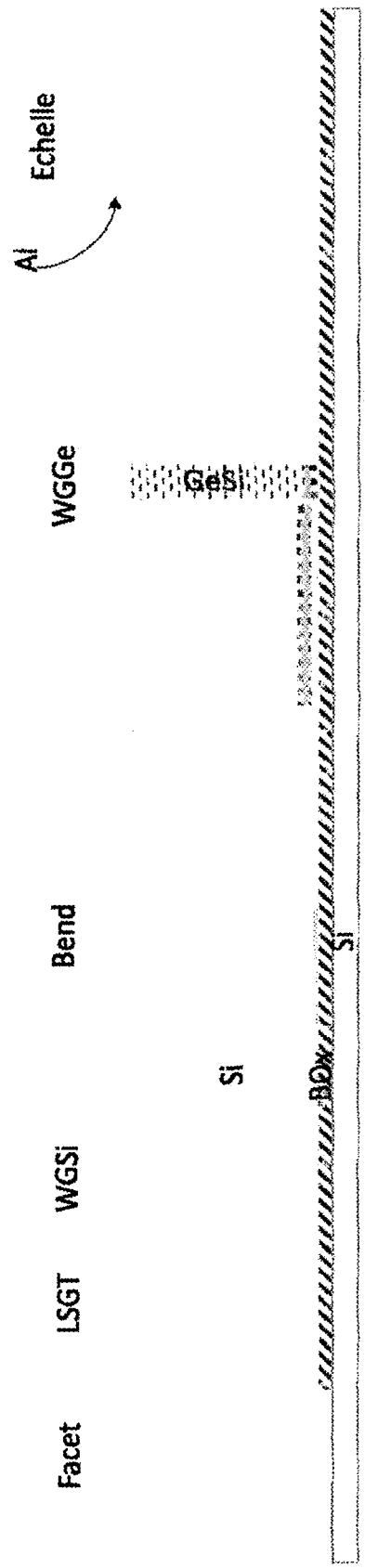
Figure 19:
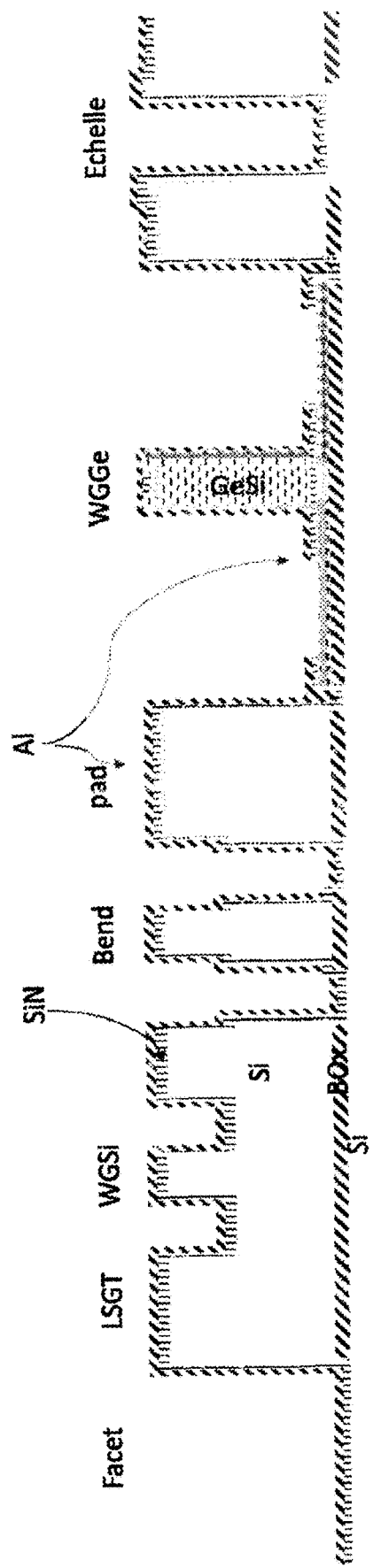
Figure 21:
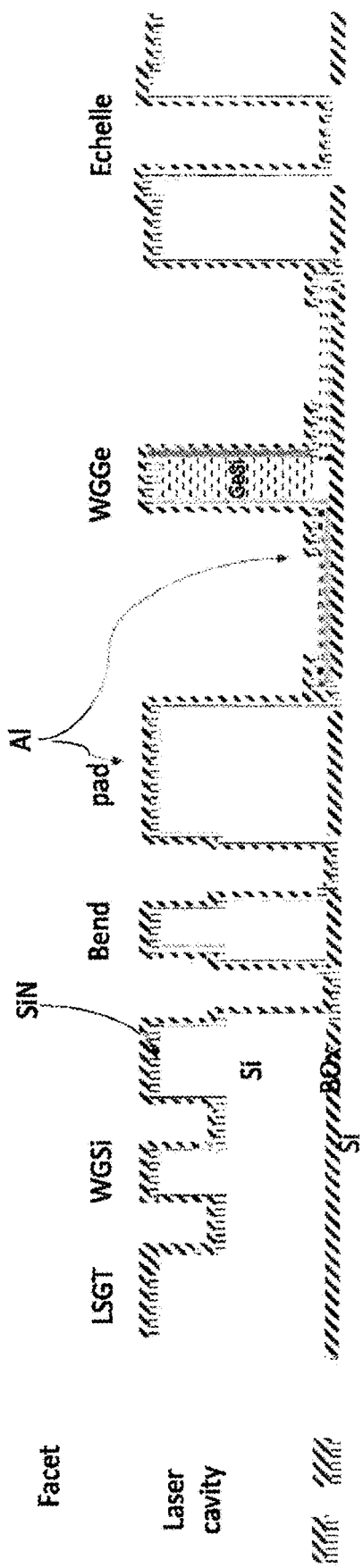
Figures 24A, 24B:
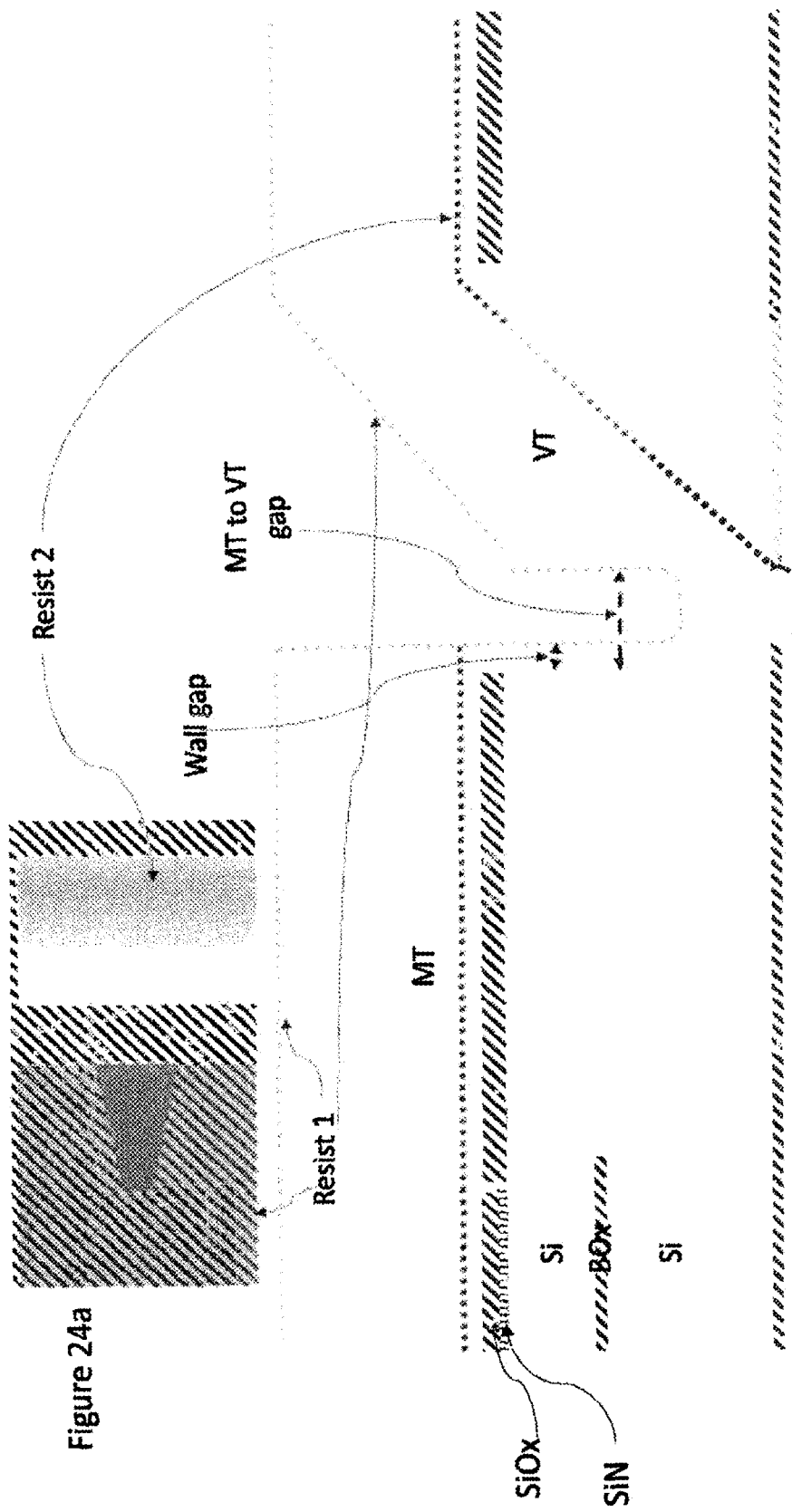
Figure 24C:
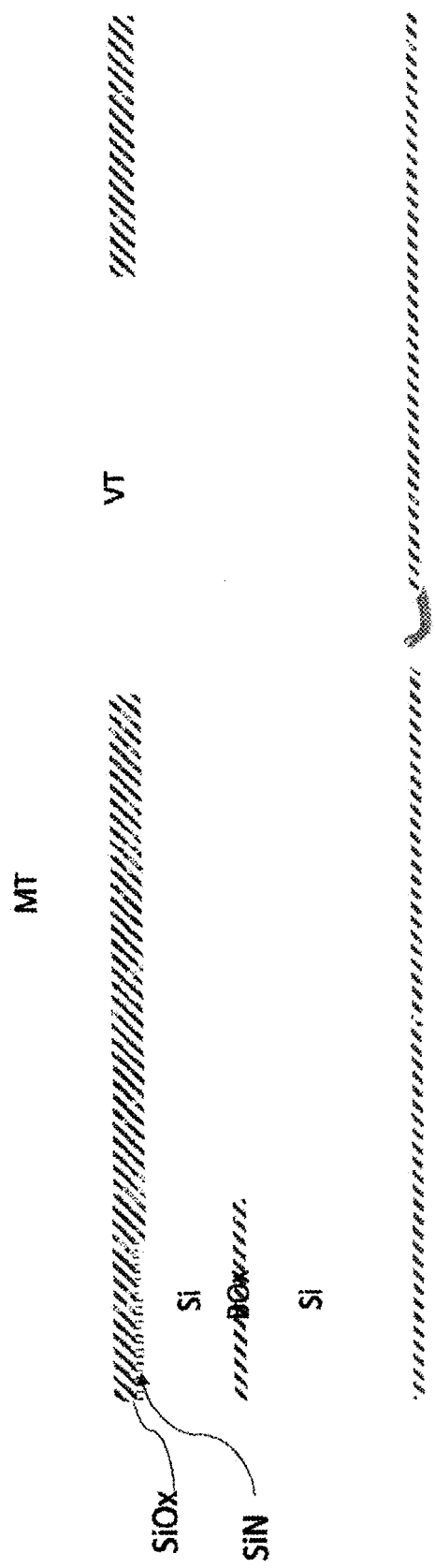
Figure 26A:
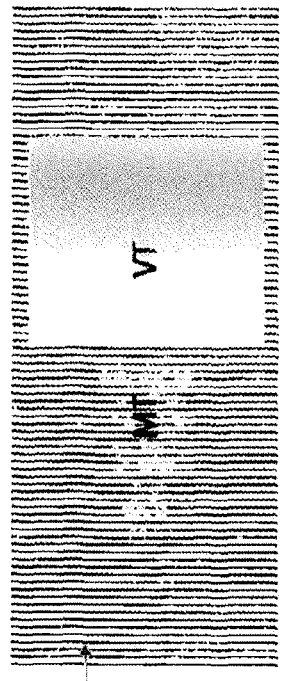
Figure 26B:
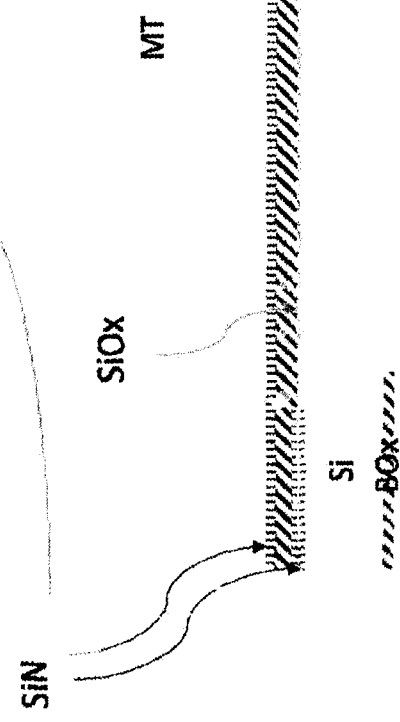
Figure 27:
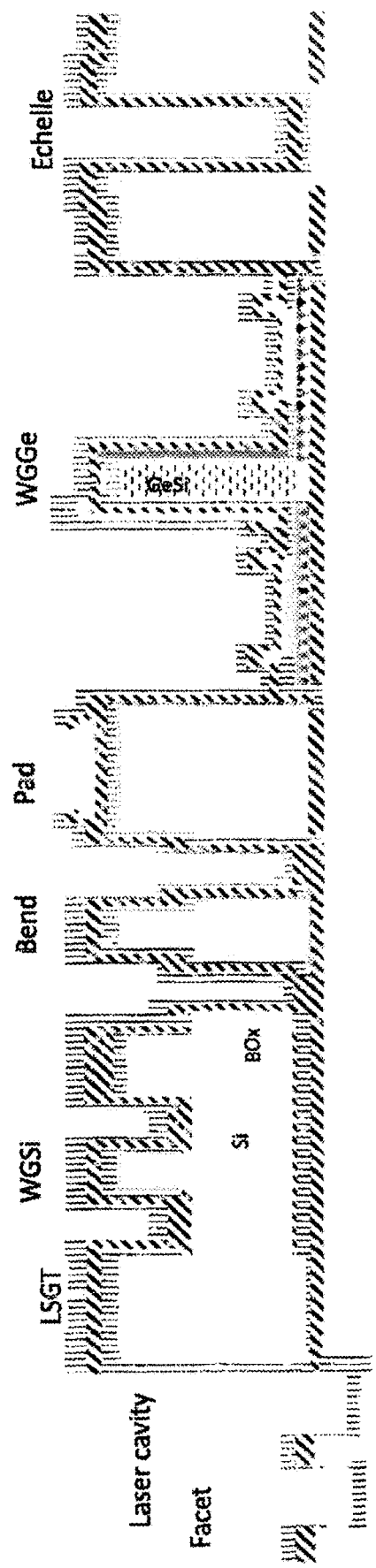
Figure 28:
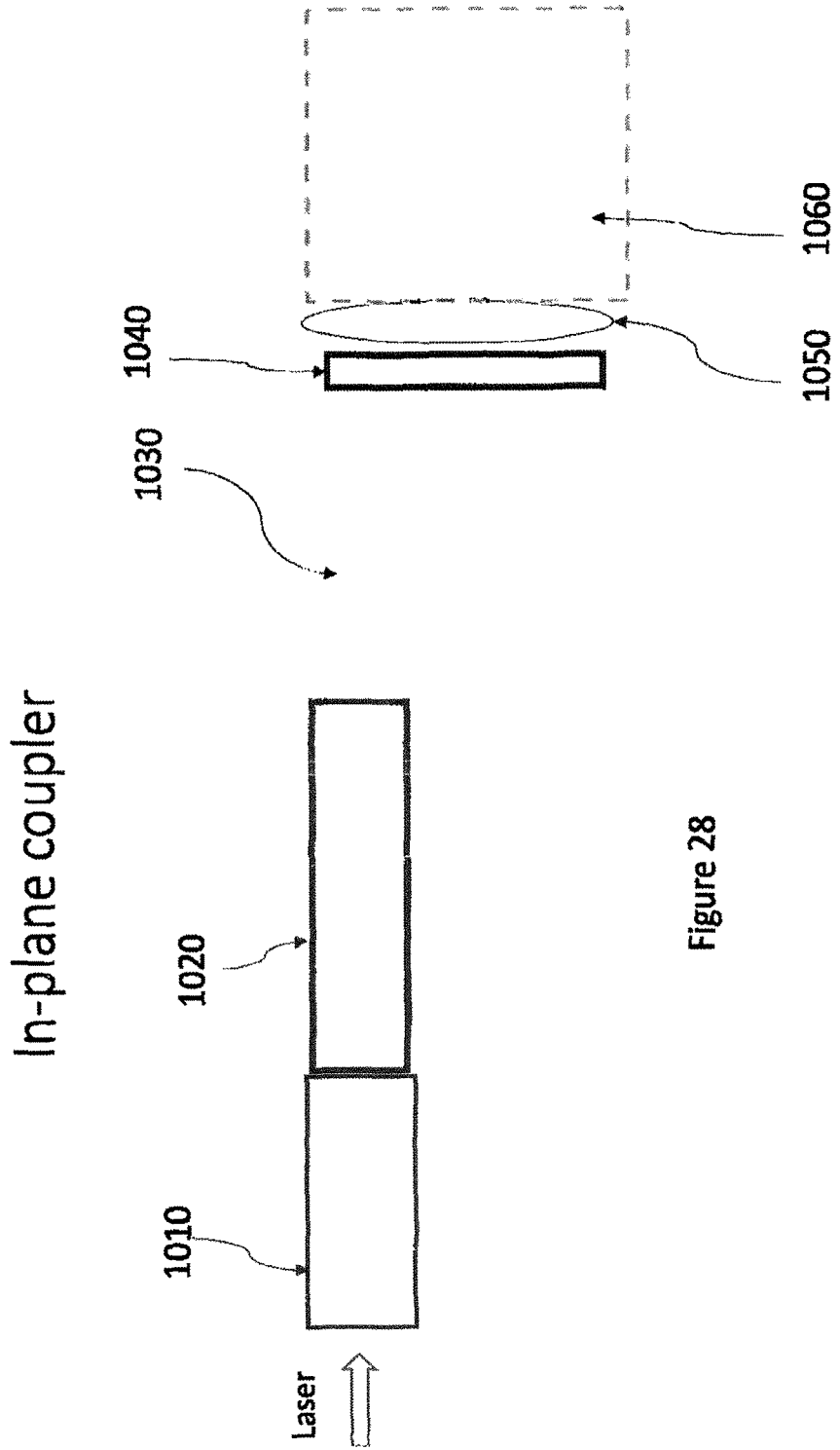
Figure 29:
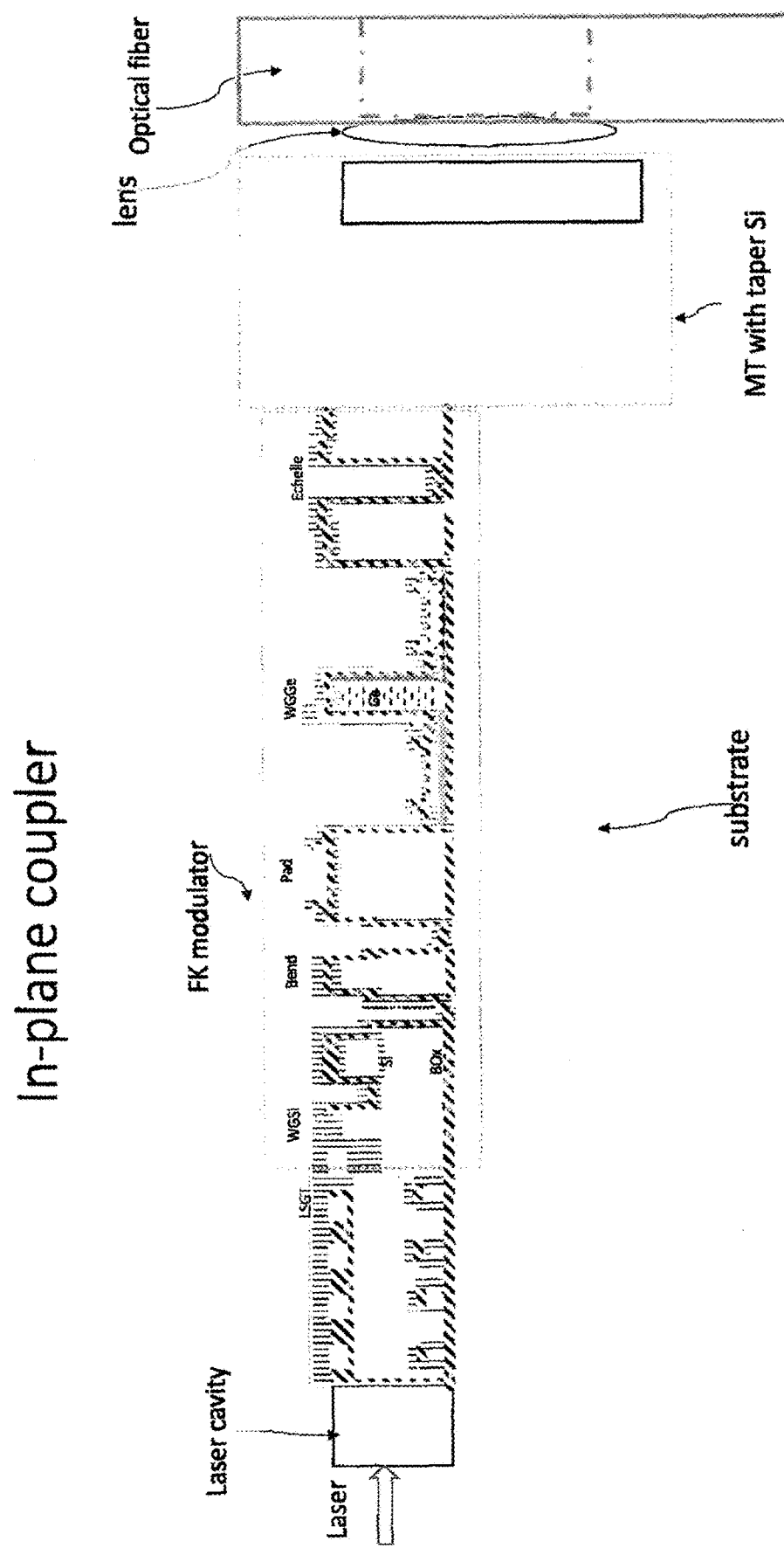
Figure 30:
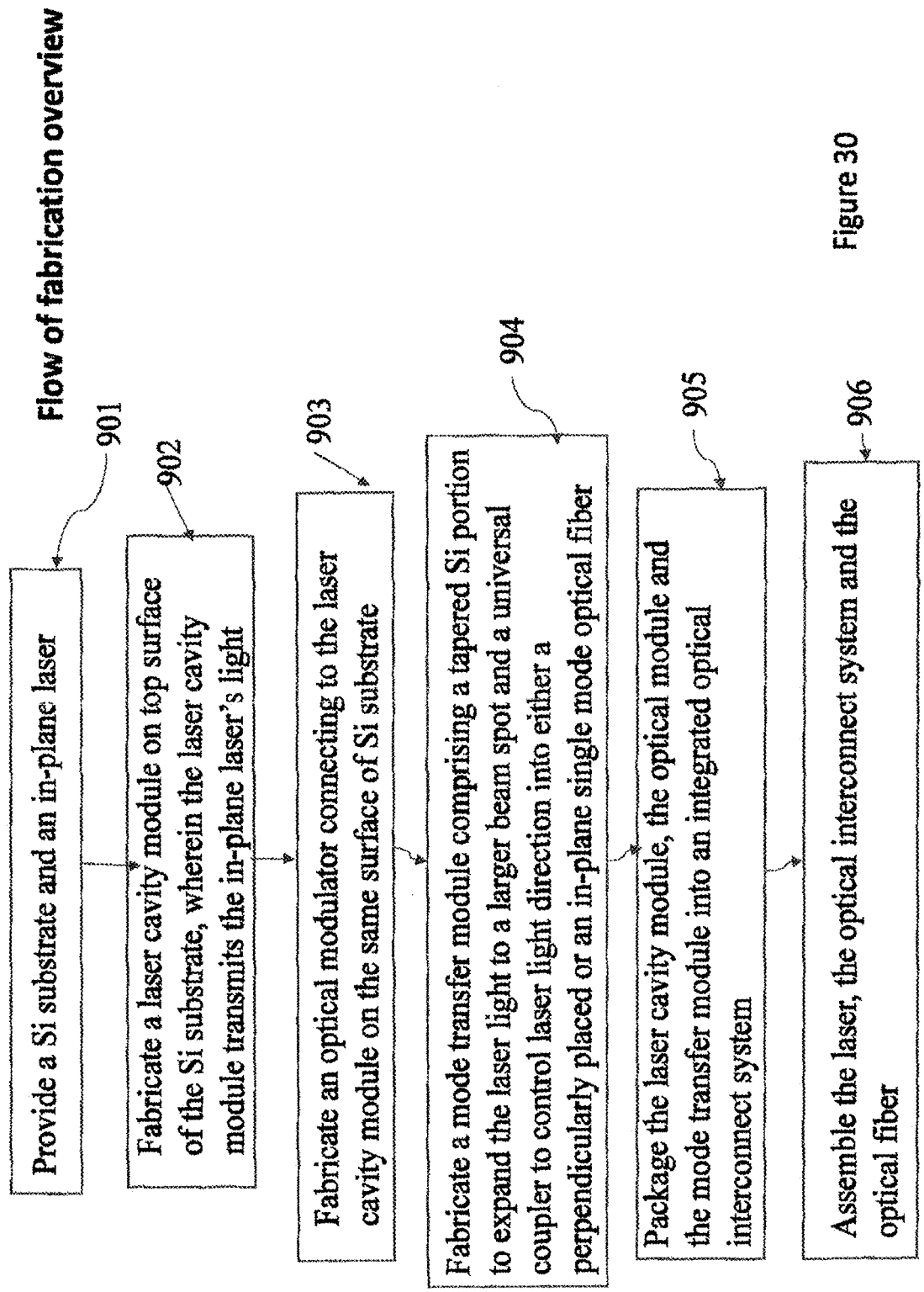
Figure 31:
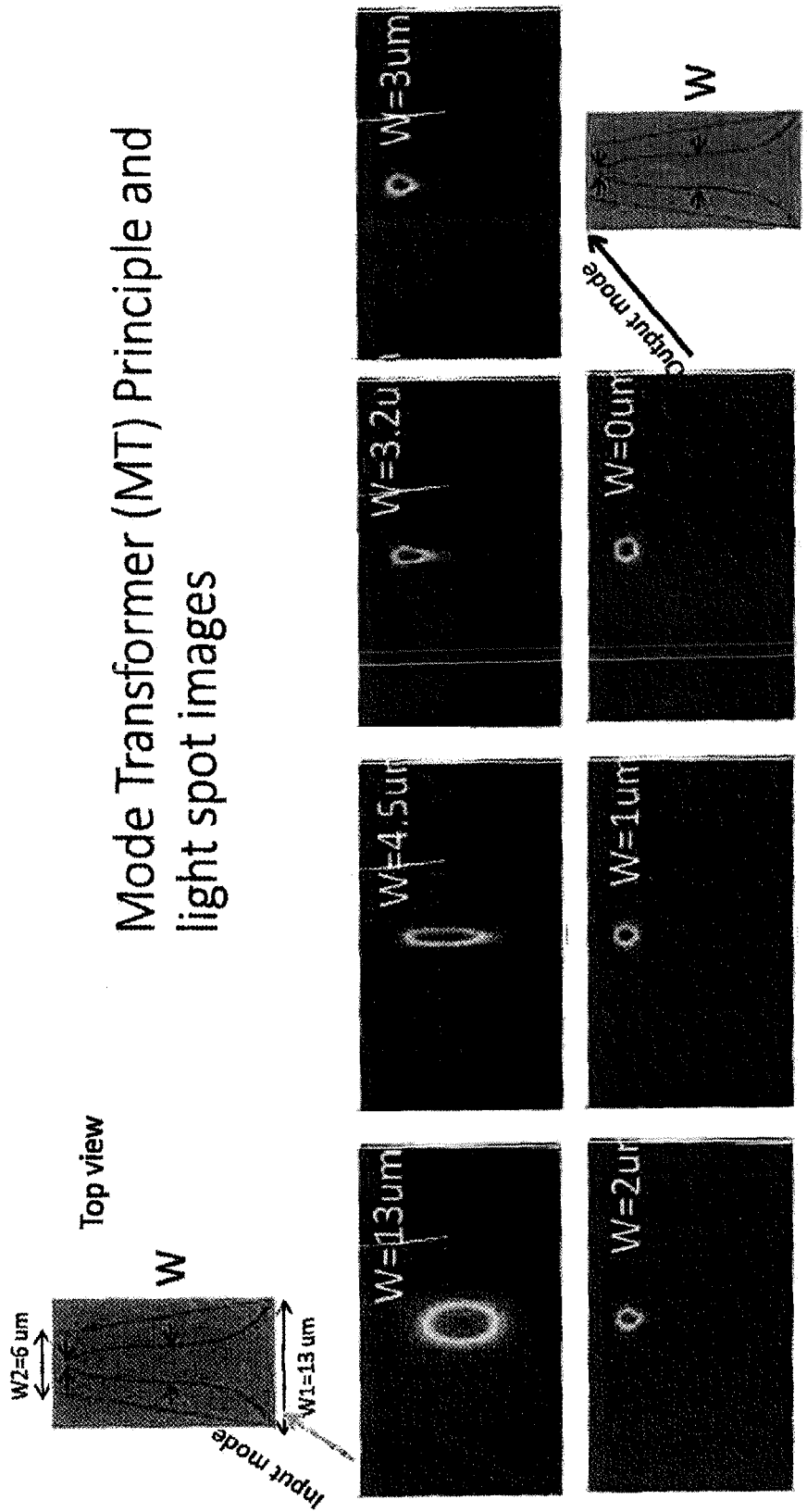
Figure 32B:
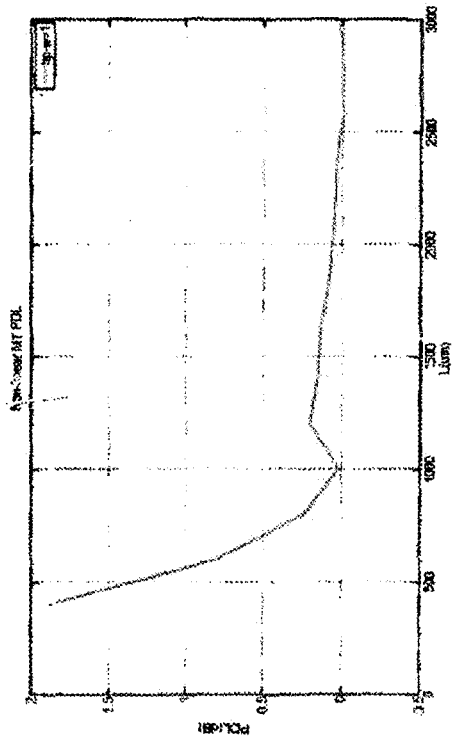
Figure 32A:
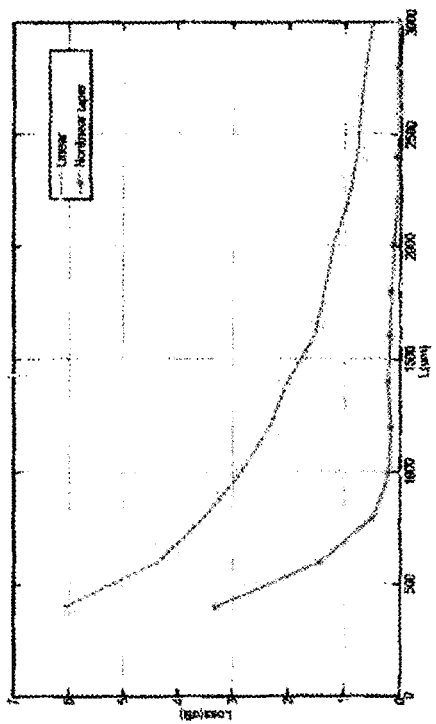

Having thus described the invention in general terms, reference will now be made to the accompanying drawings, which are not necessarily drawn to scale, and wherein:

FIG. 1 is a schematic diagram of an optical interconnect device with vertically placed fiber, according to an example embodiment;

FIG. 2 is a diagram of the optical interconnect device with the vertically placed fiber of FIG. 1 according to an example embodiment;

FIG. 3 to FIG. 27 show various steps in fabricating the optical interconnect device according to various example embodiments;

FIG. 3 is a schematic diagram of the front end of the optical interconnect device in FIG. 1, according to an example embodiment;

FIGS. 4a, 4b, and 4c show the mechanical transform area during patterning in top view and cross-sectional views, according to an example embodiment;

FIGS. 5a, 5b, and 5c show cross-sectional views of growing the first silicon epitaxial steps, according to an example embodiment;

FIGS. 6a-6f show cross-sectional views of growing the second silicon epitaxial steps, according to an example embodiment;

FIGS. 7a-7i show cross-sectional views of growing the germanium-silicon epitaxial steps, according to an example embodiment;

FIG. 8 is a schematic diagram of patterning the oxide over the optical waveguide, according to an example embodiment;

FIGS. 9a and 9b show schematic diagrams of patterning the silicon waveguide steps inside the FK optical modulator, according to an example embodiment;

FIG. 10 shows patterning the bend silicon structure inside the FK optical modulator, according to an example embodiment;

FIG. 11 shows the patterning step of germanium-silicon waveguide inside the FK optical modulator, according to an example embodiment;

FIGS. 12a and 12b show the steps of removing oxide around the germanium-silicon waveguide for poly deposit later inside the FK optical modulator, according to an example embodiment;

FIGS. 13a and 13b show the steps of depositing polysilicon over oxide and removing poly from everywhere inside the FK optical modulator except around the germanium-silicon waveguide, according to an example embodiment;

FIG. 14a shows the steps of implanting different ions at two sides of the germanium-silicon waveguide, according to an example embodiment;

FIG. 14b and 14c show the steps of patterning the laser facet at the front end and the Echelle grating at the back end of the optical waveguide, according to an example embodiment;

FIGS. 15a and 15b show the steps of patterning and removing surface oxide in the optical modulator, according to an example embodiment;

FIGS. 16a and 16b show the steps of depositing a metal layer on the facing sidewalls of the Echelle gratings in the optical modulator, according to an example embodiment;

FIGS. 17a, 17b, 17c, and 17d show the steps of depositing a heater layer selectively on one of the vertical side walls of the germanium-silicon waveguide, according to an example embodiment;

FIGS. 18a and 18b show the steps of removing SiNx and SiOx at both sides of the germanium-silicon waveguide and forming contact structures, according to an example embodiment;

FIG. 19 shows the steps of patterning metal layers on new oxide to prepare for contact structures and pad structures, according to an example embodiment;

FIGS. 20a, 20b, 20c, and 20d show the steps of depositing anti-reflective coating (ARC) over the optical modulator area, over the mode transfer area including outside the vertical coupler, and directly over the vertical coupler, according to an example embodiment;

FIG. 21 shows the steps of patterning the laser cavity behind the facet in the front end of the optical modulator, according to an example embodiment;

FIGS. 22a, 22b, and 22c show the first steps of patterning the mode transfer area including opening the tapered area, outside the taper (22b) and directly over the taper (22c), according to an example embodiment;

FIGS. 23a, 23b, and 23c show the second steps of patterning the mode transfer area including removing oxide outside the taper, according to an example embodiment;

FIGS. 24a and 24b illustrate the top view and the cross-sectional view in patterning the tapered Si and the vertical coupler in the mode transfer area, according to an example embodiment;

FIG. 24c illustrates the post-patterning cross-sectional view of the mode transfer area, according to an example embodiment;

FIGS. 25a and 25b illustrate the cross-sectional views in patterning the pad layer for the tapered Si opening in the mode transfer area, according to an example embodiment;

FIGS. 26a and 26b illustrate the top view and cross-sectional view in the patterning pad layer for the vertical coupler in the mode transfer area, according to an example embodiment;

FIG. 27 illustrates the cross-sectional view after depositing SiOx and SiN and patterning the pad layer in the laser cavity area and the optical modulator area, according to an example embodiment;

FIG. 28 is a schematic diagram of an optical interconnect device with in-plane placed optical fiber, according to another example embodiment;

FIG. 29 shows the diagram of the optical interconnect device with the in-plane placed fiber of FIG. 28 in detail, according to an example embodiment;

FIG. 30 illustrates the schematic diagram of the fabrication process flow, according to an example embodiment;

FIG. 31 shows the simulation results of the mode transferred light spot images, according to an example embodiment;

FIGS. 32a and 32b show the simulation results of the mode transfer loss and polarization dependent loss versus length for linear and nonlinear tapered silicon mode transfer modules, according to an example embodiment; and FIGS. 33a, 33b and 33c show the simulation results of SMF Fiber to MT face coupling loss with different MT to fiber gaps, according to an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the features, structures, configurations, or characteristics may be combined in any suitable manner in one or more embodiments.

The terms "over", "spanning", "to", "between", and "on" as used herein may refer to a relative position of one layer with respect to other layers. One layer "over", "spanning", or "on" another layer or bonded "to" or in "contact" with another layer may be directly in contact with the other layer or may have one or more intervening layers. One layer "between" layers may be directly in contact with the layers or may have one or more intervening layers.

Photonic integrated couplers are a current area of investigation for a variety of applications. For example, various types of photonic integrated couplers have applications in fiber-optic communications, the biomedical field, photonic computing, and other fields. Various fiber-optic communications applications, for example, may require a signal from an optical waveguide to be passed to an external optical fiber cable. Thus, efficient methods for coupling and/or efficient coupling devices are needed for coupling an integrated optical waveguide to an external optical fiber cable.

In some applications, optical fibers maybe positioned in-plane of a propagating light beam from the laser and the in-plane placed optical modulator. In other applications, optical fibers maybe positioned displaced perpendicular to the propagating light beam from the laser and the in-plane placed optical modulator. A universal coupling scheme is disclosed in the following paragraphs. Some embodiments include a vertically coupled interconnect system, which are described first in FIGS. 1-27. Other embodiments include an in-plane coupled interconnect system described afterwards in FIGS. 28 and 29. The brief fabrication flow diagram provided in FIG. 30 and simulation results shown in FIGS. 31-33 may apply to both embodiments.

Referring now to FIG. 1, FIG. 1 shows a schematic diagram of an optical interconnect device with vertically placed fiber, according to an exemplary embodiment. The interconnect device is fabricated on the top surface of a substrate (shown in FIG. 2). An in-plane laser emits a laser beam into a laser cavity 110. The laser cavity is typically followed by a laser grating area. The laser beam propagates along the surface of the substrate and enters the in-plane optical modulator 120. The optical modulator 120 can be a traditional Mach-Zehnder Interferometer style modulator. As an example, it can be an advanced Franz Keldysh-Modulator (FK Modulator), which is an electro-absorption (EA) device based on the Franz-Keldysh effect for bulk semiconductors, where an applied electric field modifies and distorts the energy bands of the material in the FK Modulator.

One advantage of FK Modulators is that they can be made 25 times smaller than a traditional Mach-Zehnder Interferometer style modulators. The length of the FK modulator is less than 50 μm while a Mach-Zehnder Interferometer style modulator would be measured in millimeters. The small size reduces the drive capacitance and power consumption. Additionally, the drivers can be implemented in pure CMOS platform. The FK Modulators using Ge quantum wells can be made as small as 10 μm long and these are expected to operate at up to 500 Gb/s.

Although the light beam is miniaturized by the FK Modulator, it has to align with and propagate through an external optical fiber. A standard single mode fiber has a larger diameter of 5-10 μm. Moreover, the orientation of the external fiber may be at an angle with respect to the in-plane laser beam. The diameter mismatch and orientation change present significant challenges in assembling the fiber cable to the photonic device, resulting in high integrating loss.

It often requires an efficient and universal mode transfer device to match the smaller modulator to the larger optical fiber placed either in-plane or out-of-plane with the laser beam.

In FIG. 1, a tapered silicon piece 130 and a universal coupler 140 are combined to form the mode transfer module. The universal coupler 140 in FIG. 1 is a 90-degree vertical coupler in the case where the fiber is perpendicularly placed with respect to the top surface of the substrate. However, the universal coupler can be made to direct the laser beam in other directions, such as in the example of FIG. 28 where fiber is placed along the laser beam direction. Other directions different from these two examples—0 degree or 90 degree—can be achieved by properly designed universal couplers.

In the depicted example, the modulated light enters a tapered silicon piece 130 and the output light from the taper is a much-enlarged light beam with a size matching the dimension of the external optical fiber 160, and in particular matching the dimension of the fiber core. A surface lens 150 placed in front of the external optical fiber focuses the exiting beam from the universal coupler 140 into the external optical fiber 160 (which may be, in some cases, a single mode fiber) for better coupling efficiency. The surface lens 150 can be a fused-in lens on the front end of the fiber 160.

FIG. 2 shows a detailed view of a cross section of the optical interconnect device with vertically placed fiber of FIG. 1. A substrate is shown as the support for the interconnect device. The substrate can be a silicon wafer, a Si-on-Insulator or SOI wafer, or a separate thin plate bonded to the substrate. For a silicon photonic device, in which silicon substrate is more commonly used, FIG. 2 shows on the left a laser light emitted by a laser (not shown), a front end laser cavity and a laser grating piece (LSGT), followed by an in-plane FK modulator, and a mode transfer module including a tapered Si piece and a vertical coupler configured to turn the light beam upward into a lens and an external optical fiber. The FK modulator structure includes a silicon waveguide piece (WGSi), a germanium waveguide (WGGe) which contains germanium-silicon mixture, a silicon bending piece (Bend), an Echelle Grating (Echelle), and an interconnecting output port (Pad). Fabricating the interconnect according to embodiments of the invention involves many steps which will be described in more detail in the following paragraphs with reference to other figures.

FIG. 3 to FIG. 27 show various steps in fabricating the optical interconnect device. Various structures will be discussed separately in individual figures when other structures may not be drawn.

FIG. 3 is a schematic diagram of the front end of the optical interconnect device in FIGS. 1 and 2. Substrate SOI includes a bottom silicon surface 301 and the bulk silicon layer 303, where the embedded oxide 302 layer is either a bonded layer or an oxygen implanted layer. The laser grating structure 310 is designed to configure the input laser beam. The absorber 320 defines an area where the electro-absorber (EA) device can be altered by an electric field. Light alignment marks 330 are provided to accurately guide the input laser light to align with the optical modulator.

FIGS. 4a, 4b and 4c show the mode transfer area during patterning of the opening 310 in top view and cross-sectional views. The SOI substrate has the silicon layer 301, the embedded oxide layer 302 and the bulk silicon 303. In FIG. 4a, the opening 310 surrounds the tapered silicon piece 309.

The top view shows that the mode transfer area has three subareas covered with three top layers—the oxide 307 covers the tapered structure 309, the opening area 310 is covered by the bottom oxide 302, and other areas outside the taper and opening are covered by oxide 308. This is better understood with reference to FIG. 4b and FIG. 4c.

FIG. 4b shows the cross section of the small area in FIG. 4a along line A and A' before the opening 310 is patterned out. In the tapered structure, a layer of oxide 304 is embedded deep into the bulk silicon, but this oxide 304 is not added into the other bulk silicon area 303. In addition, a layer of SiN 306 is deposited first, before the oxide 307 is laid down on the top surface of the tapered area 309. A top oxide layer 308 is deposited over the entire surface. FIG. 4c shows the area cross section along line A-A' after etching the opening 310 all the way to the embedded oxide 302 top surface.

FIGS. 5a, 5b, and 5c show cross-sectional views of growing the first silicon epitaxial steps to form the silicon waveguide. The same SOI substrate 301, 302, 303 is shown to support the silicon waveguide. In FIG. 5a, a layer of oxide 315 is deposited over the silicon wafer. A resist 311 defines the edge of the waveguide trench line in oxide 315. FIG. 5b shows, after the patterning, the step of removing trench materials in oxide 315 and in bulk silicon 303. FIG. 5c shows the waveguide trench 320 after the top oxide 315 and the embedded oxide 302 at bottom of the trench 320 are both removed, exposing only silicon surface.

Figure 6A:
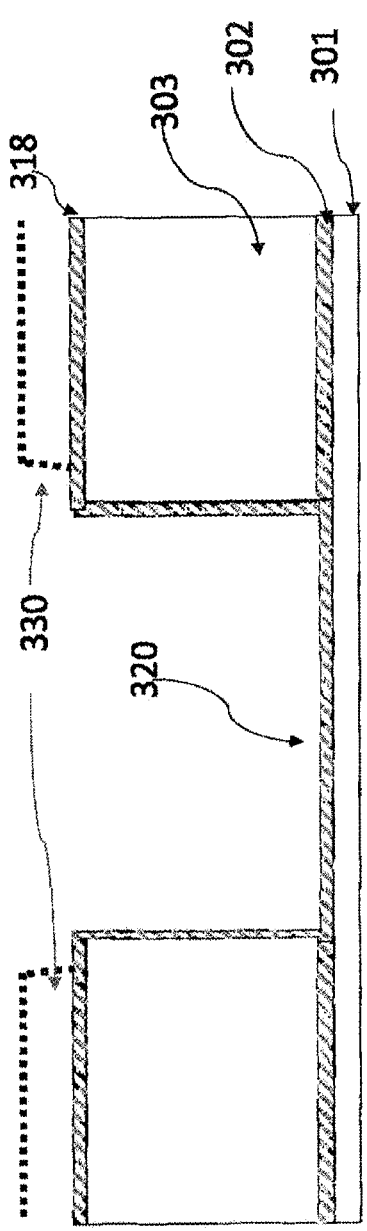
Figure 6B:
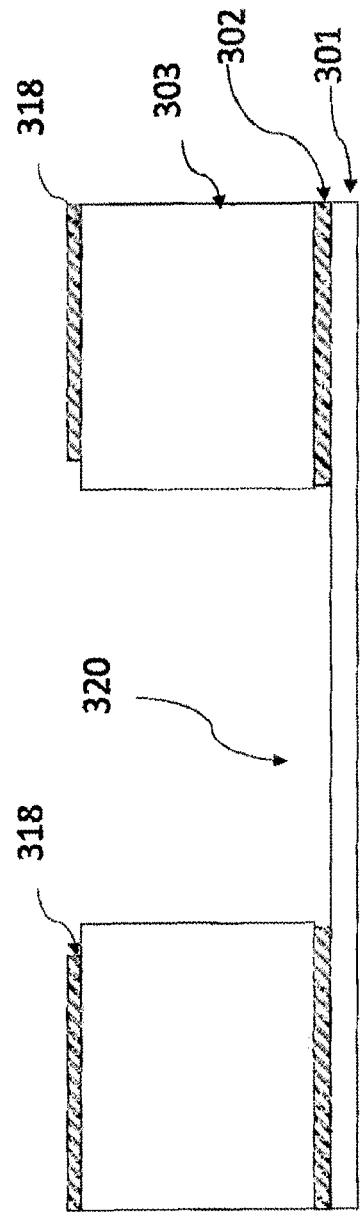

FIGS. 6a-6f show cross-sectional views of continuing the growing of the silicon epitaxial steps. FIG. 6a shows a new deposited layer of oxide 318, which covers the waveguide from the trench bottom, trench sidewalls, to trench bank top surface. The resist 330 may then be applied to define recessed edges of the banks of waveguide 320. Lithography and etch may then be used to remove the oxide 318 from inside the trench 320, keeping the oxide 318 over the trench banks recessed from the edges as shown in FIG. 6b. At this point, the silicon waveguide trench 320 is ready for epi silicon.

FIG. 6c illustrates the structure after the seed silicon monocrystal layer 321 is deposited into the trench in an epitaxial process. This epi silicon layer 321 covers the trench bottom, sidewalls, and the bank edges which were left open by the recessed oxide 318. The dashed areas at the edge A and at the trench bottom corner B have been enlarged to show as FIG. 6c (aa) and FIG. 6c (1b) at the left side of the FIG. 6c. In FIG. 6c (1a) or A, the single crystal silicon 321 has grown over the recessed oxide 318, also called a hard mask (HM), to prepare for polysilicon growth sideways. In FIG. 6c(1b) or B, single crystal silicon 321 covers the embedded oxide 302 at the trench bottom corner.

Figure 6D:
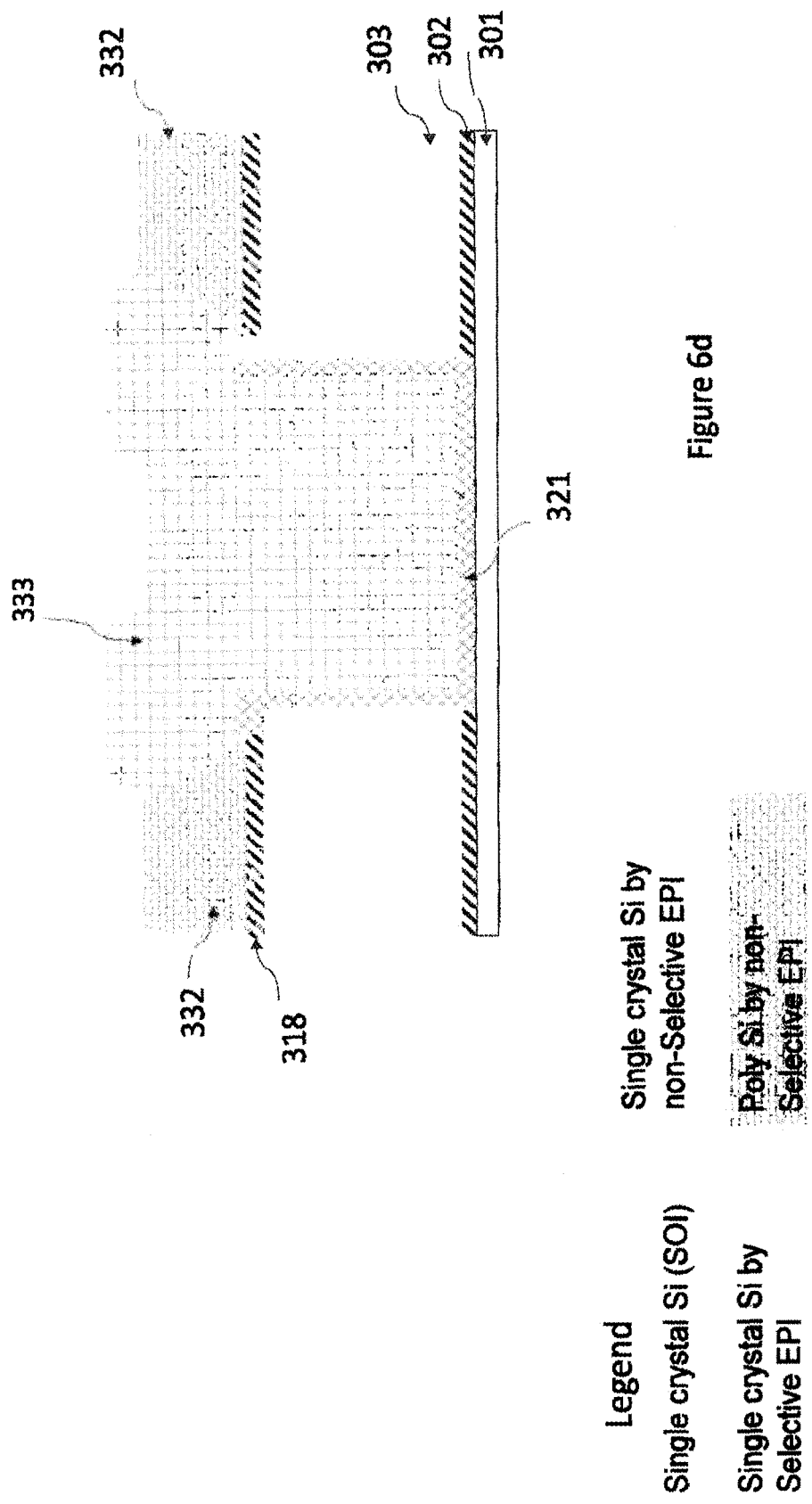

FIG. 6d illustrates the cross section of the silicon waveguide after growing epitaxial non-selective single crystal silicon 333 over the selective single crystal silicon 321 and growing polysilicon 332 sideways over the hard mask top oxide 318.

FIG. 6e shows the silicon waveguide cross section after Chemical Mechanical Polishing (CMP) which removed the uneven top non-selective single crystal silicon and the polysilicon 332 over the trench banks. CMP targets the total top oxide 318 (hard mask) remaining less than 100 nm. The edges 340 of the trench 320 are enlarged to show more details in the left diagram. The CMP polish may leave a dishing of the single crystal silicon top surface, with the dishing of the epi silicon 333 targeted at less than 100 nm lower than the top of silicon. The dishing may be controlled to be +/−100 nm.

The gas annealing process after CMP recrystallizes the silicon in the trench 350 in FIG. 6f.

The mode transfer area, especially the tapered silicon structure, is protected in the process of making the modulator.

Figure 7C:
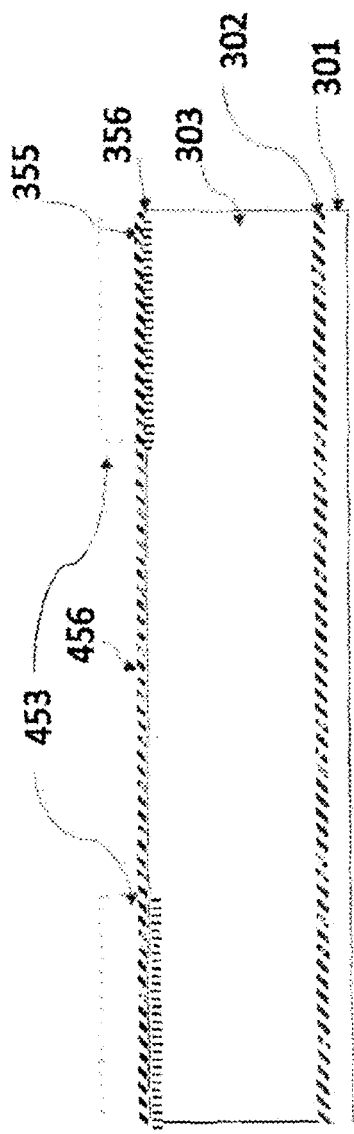
Figure 7D:
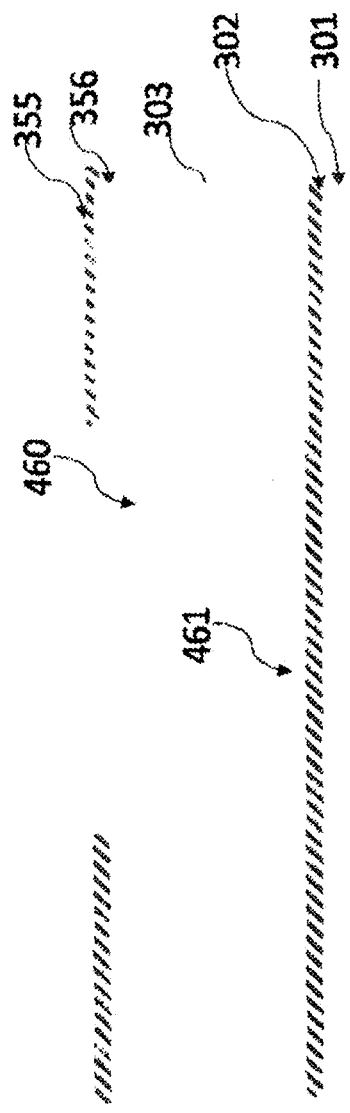
Figure 7E:
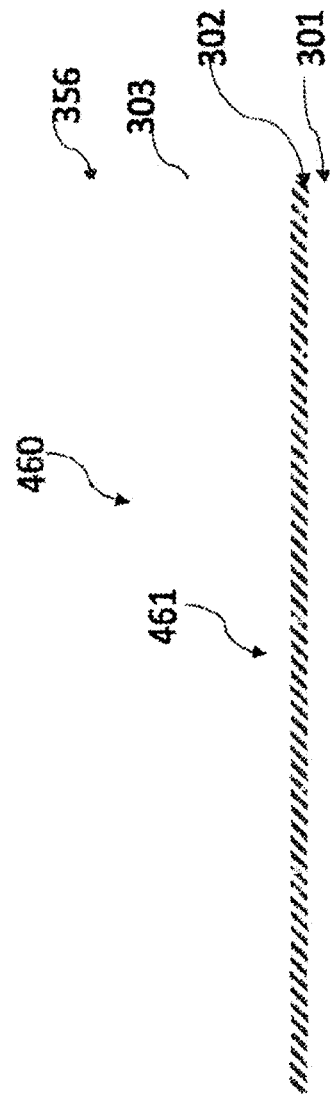
Figure 7H:
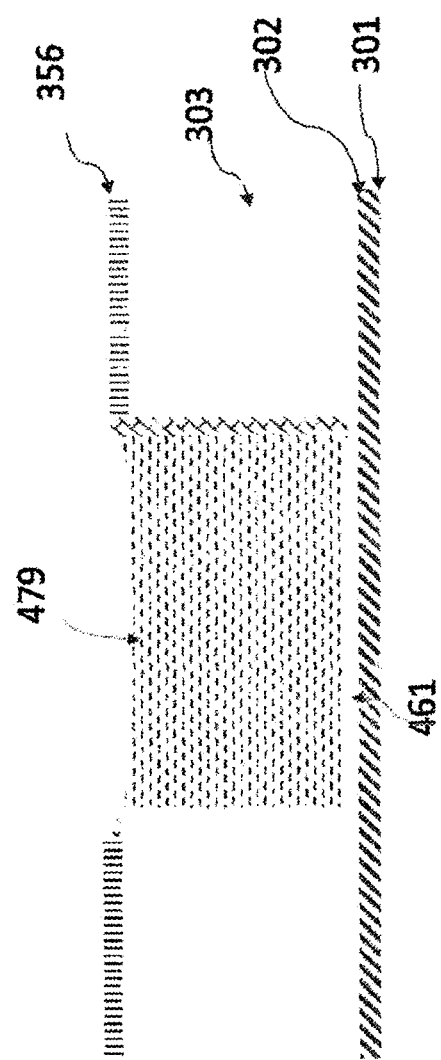

FIGS. 7a-7i show cross-sectional views after each of the epitaxial germanium-silicon growth steps to form a germanium waveguide. An SOI substrate 301, 302, and 303 as described before supports the germanium waveguide. FIG. 7a starts with depositing a layer of nitride (SiN) 356 on the top surface of the SOI substrate, followed by depositing a layer of oxide (SiOx) 355 on the nitride 356. A photoresist 353 is patterned to define the edges of the germanium waveguide. FIG. 7b shows the post patterning cross section after nitride 355 and oxide 356 in the waveguide are removed. Another layer of oxide 456 may be deposited into center top surface, and a patterning photoresist 453 defines the waveguide trench in FIG. 7c. The post patterning cross section is shown in FIG. 7d, where the trench 460 is opened, and the trench banks are covered with nitride 356 and oxide 355, wherein the oxide 355 is recessed away from the trench edges. A layer of seed silicon 461 is deposited through an epitaxial process on the bottom surface of the trench 460. Then the oxide layer over the banks 355 are removed leaving the recessed nitride layer 356 as the protective top layer on the banks in FIG. 7e.

FIG. 7f shows the cross section after depositing another layer of oxide 475 on the banks and 477 on the trench side walls and trench bottom on the seed silicon layer 461. A recessed resist on the banks protects the oxide 475 and nitride 356 during etching of oxide 477 inside the trench 460.

In FIG. 7g, germanium-silicon is deposited into the trench 460 in an epitaxial growth process (EPITx) with a mixture of germanium atoms and silicon atoms at an appropriate ratio. For Examples $Ge_{1-x}Si_x$ (where x is 0.02 to 0.3). The overgrown epi at the edges of the waveguide 470 is enlarged to show details at the left side of FIG. 7g. The top oxide 475 is recessed away about 1 μm from the trench side wall and the underlying nitride 356 is recessed away about 3 μm from the trench side wall, shown in FIG. 7h.

Figure 7I:
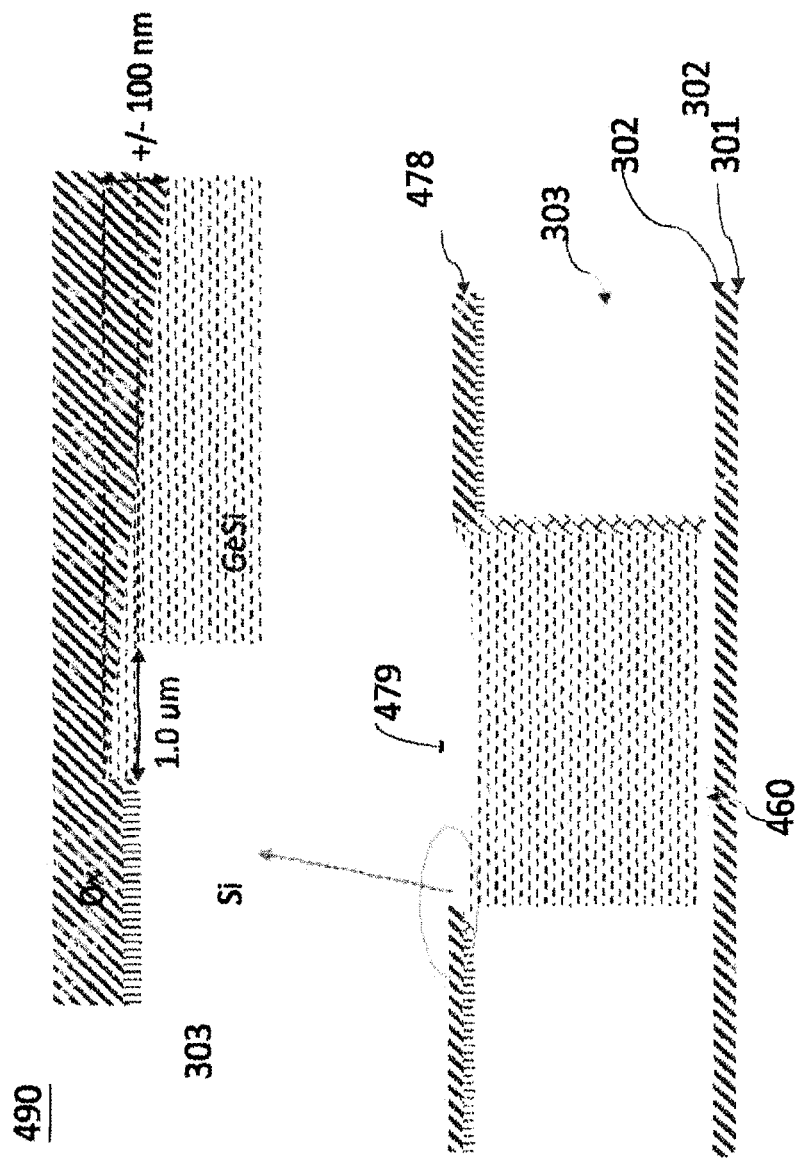

In the following CMP process to remove excess germanium-silicon from the trench top, a layer of oxide 478 is deposited to assist the polishing process, as shown in FIG. 7i. CMP induced dishing 479 in FIG. 7i is enlarged into a detailed FIG. 490 drawn on top of FIG. 7i. As shown in 490, the dishing is controlled at +/−100 nm. The germanium-silicon waveguide trench is thus filled.

FIG. 8 is a schematic diagram that shows the patterning of the oxide over the optical waveguide. An oxide layer may be deposited onto the laser cavity area and the FK modulator area, a patterning process may protect the sequentially positioned laser facet, laser grating, silicon waveguide, silicon bending, germanium waveguide (which may consist of a mixture of germanium and silicon) and the Echelle grating, but it exposes the trench outside the germanium waveguide.

FIGS. 9a and 9b show schematic diagrams of cross-sectional views of the optical interconnect device before (9a) and after (9b) patterning the silicon waveguide step within the FK optical modulator. After this lithography-etching process, silicon waveguide forms side trenches outside the silicon waveguide.

FIG. 10 shows the patterning of the bend silicon structure within the FK optical modulator. In FIG. 10, the resist layer and post etching structures involve multiple steps which are all shown in one figure.

FIG. 11 shows the patterning steps of the germanium-silicon waveguide inside the FK optical modulator. As illustrated, the photoresist is disposed to open up the trench area around the germanium waveguide, and the etching process removes material in the area to the trench bottom to expose the embedded oxide.

FIG. 12a shows the step of disposing photoresist to cover all areas in the optical interconnect except the oxide near the foot of the germanium waveguide in order to expose the monocrystal seed layer at the bottom of the germanium waveguide.

FIG. 12b shows the post patterning of the germanium waveguide inside the FK optical modulator. At this point in the process, according to the depicted embodiment, the structure is ready for poly deposit around the germanium waveguide.

FIG. 13a shows the steps of first depositing polysilicon over oxide inside the FK optical modulator and then disposing photoresist to protect the trenches of the germanium waveguide. Only two polysilicon arrows are drawn in this figure, representing all polysilicon layers inside and outside of the germanium trench.

FIG. 13b shows the cross-sectional view of the FK optical modulator after removing the polysilicon from everywhere except the bottom surfaces in the trenches of the germanium waveguide.

FIG. 14a shows the steps of implanting two different ions—P++ and N++ respectively at two sides of the germanium-silicon waveguide. The doping concentrations should be higher than of $10^{17}$ for both P++ and N++.

FIGS. 14b and 14c show the steps of patterning the laser cavity facet at the front end and the Echelle grating at the back end of the optical modulator waveguide. In FIG. 14b, the photoresist is disposed on the modulator with an opening over the facet and a number of grating openings in the Echelle Grating. In FIG. 14c, the cross-sectional view of the modulator is illustrated after the patterning.

FIGS. 15a and 15b show the steps of removing surface oxide in the optical modulator. Photoresist is disposed to protect the side walls of the silicon waveguide and the germanium waveguide and the side walls of the Bend structure. The post patterning cross-sectional view of the interconnecting module is shown in which oxide is also removed from the tops of the silicon and germanium waveguides.

FIGS. 16a and 16b illustrate the steps of forming metal coatings in the Echelle Grating. A layer of metal, such as aluminum, tungsten, or copper is deposited on the optical modulator, followed by disposing a layer of photoresist to protect the sidewalls of the opposing gratings in the Echelle Grating in FIG. 16a. Etching is performed to remove most of the metal layer, leaving only the facing sidewalls of the Echelle Gratings covered with metal.

Figure 17A:
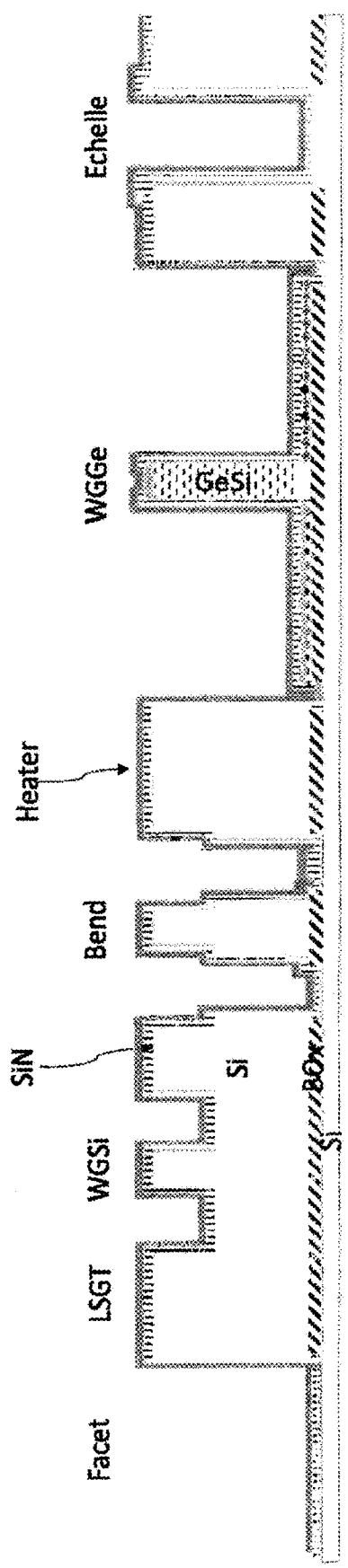
Figure 17B:
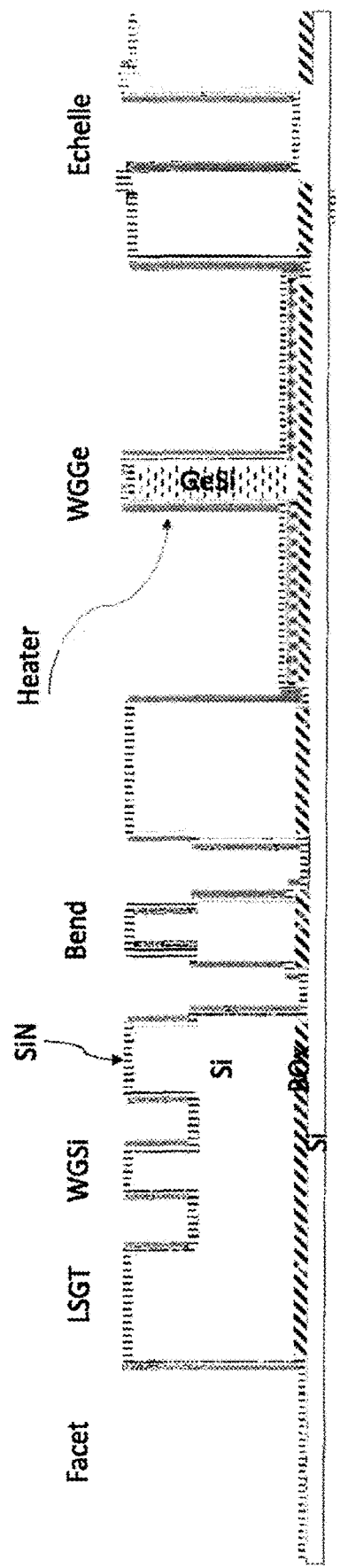
Figure 17C:
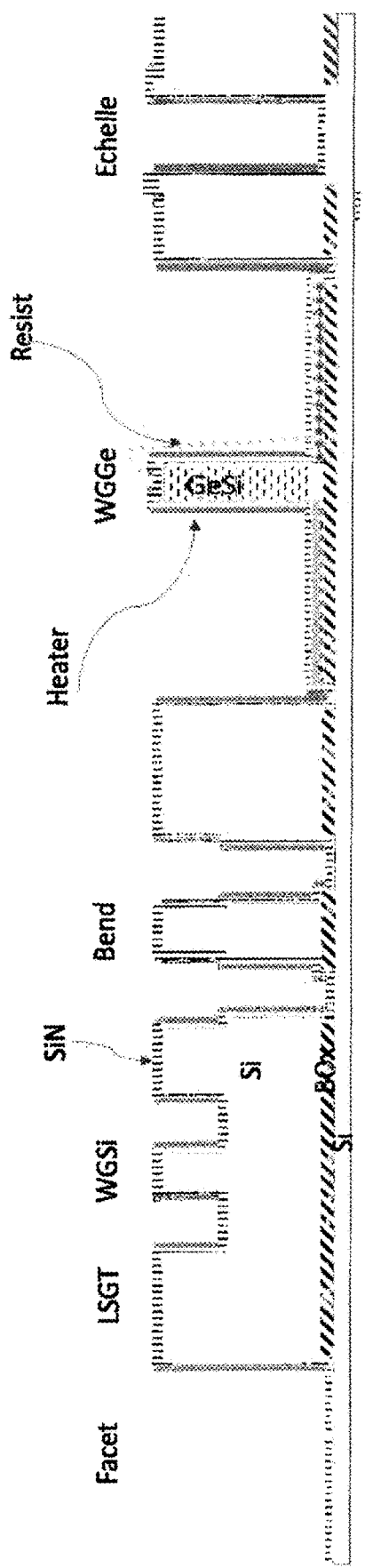
Figure 17D:
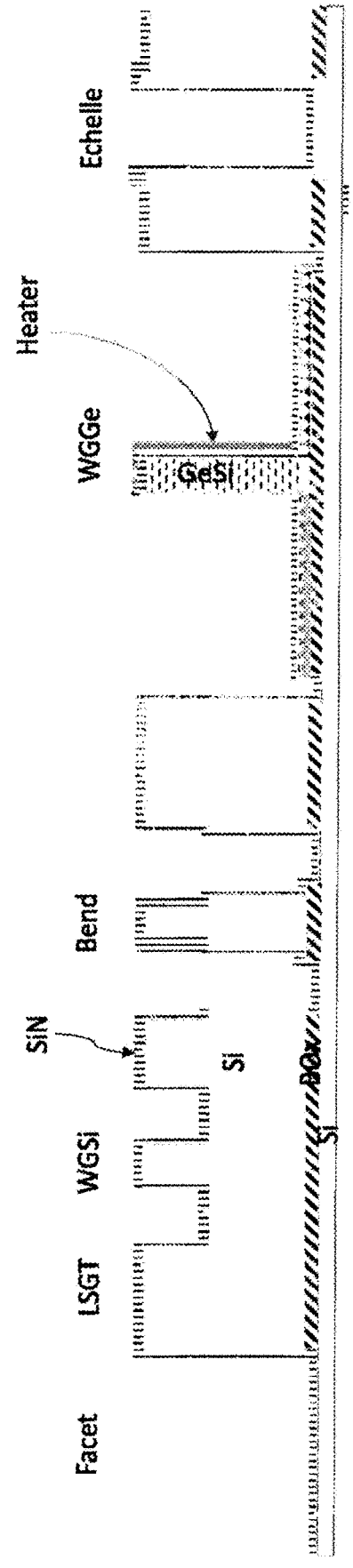

At this point a heater layer is added on one side wall of the germanium waveguide. The material of the heat layer includes a metal material such as aluminum, tungsten, or an alloy. FIG. 17a shows the coverage of the metal layer. Then the horizontal metal surfaces are removed in FIG. 17b with isotropic/anisotropic etch on metal process and all vertical surfaces are still covered with the metal layers. In order to keep the heater metal layer only on one vertical wall of the germanium waveguide, a photoresist layer may be disposed on the selected germanium wall as illustrated in FIG. 17c. After patterning the metal layer, all other vertical metal layers may be removed, leaving only the heater layer selectively on one of the vertical side walls of the germanium waveguide as shown in FIG. 17d.

Interconnecting contact structures are formed next in the trenches of the germanium waveguide. First a photoresist layer is disposed over most surfaces of the optical modulator, exposing only portions next to the germanium waveguide in FIG. 18a. An etch process follows to remove the top oxide (SiOx) and nitride (SiNx) to expose the bottom crystalline surface in the trenches at the sides of the germanium waveguide. After the patterning step, the doped germanium-silicon mixture layer is opened up as shown in FIG. 18b. At this point in the process, the contact structures are ready to be built.

The steps of patterning contact metal are simplified in FIG. 19, in which a photoresist layer is deposited and patterned through lithography and etching. As such, the cross section shown in FIG. 19 shows the metal structures on the selected areas near the germanium waveguide used for contacts and future pad structures. The interconnecting materials can be aluminum, tungsten, copper, or an alloy of metals.

Figure 20A:
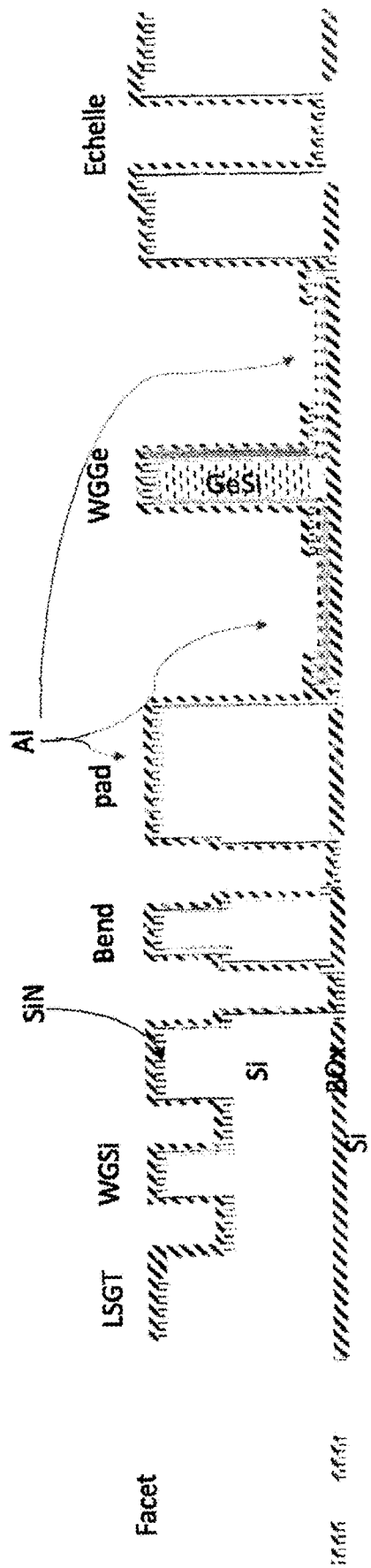

In some embodiments, anti-reflective coatings (ARC) are necessary for reducing stray light signals. ARCs are formed with oxide at a certain thickness to produce antireflective nodes. Various areas of the device need different ARCs because of their top material differences, therefore they need to be patterned separately with photoresist covering other areas. First the laser facet area gets the ARC in FIG. 20a. The mode transfer area is patterned with its top view in FIG. 20b and cross-sectional views in FIG. 20c, where the photoresist covers the part in front of the tapered silicon, and a layer of oxide (SiOx) is deposited over the mode transfer including the tapered Si. After the deposition, an etching follows which removes the newly deposited oxide from the tapered Si's top surface as shown in FIG. 20d.

FIG. 21 shows the cross section after several patterning steps of the laser cavity in the front end of the optical modulator near the facet.

FIGS. 22a, 22b, and 22c illustrate how the mode transfer module is fabricated. In the depicted embodiment, there are three photoresist patterning processes involved in making this module. The first patterning includes disposing photoresist to cover the part in front of the tapered silicon and etching the oxide outside the tapered silicon all the way to the embedded oxide near the bottom surface of the substrate. The cross-sections of the mode transfer before and after the first patterning are illustrated in FIGS. 22b and 22c.

The second patterning process to prepare for the vertical coupler is shown in FIGS. 23a, 23b, and 23c. A photoresist layer is disposed over the section including the tapered silicon. The top view of the photoresist is shown in FIG. 23a and the cross-sectional view is shown in FIG. 23b. FIG. 23c is the post etching cross-section, where the tapered silicon area is protected, and the cutout around the taper is unchanged.

An embodiment of the third patterning process to form the vertical coupler is illustrated in FIGS. 24a, 24b, and 24c. A layer of photoresist is disposed over both the part in front of the taper and the taper section. The top view of the mode transfer module includes the photoresist covering the area outside the gap between the VT and the MT in FIG. 24a. FIG. 24b illustrates an embodiment of the cross-sectional view after patterning the vertical coupler in the mode transfer area and the vertical coupler (VT). There are two kinds of resists that may be applied in this step: one that patterns the vertical coupler (VT) using gray tone mask, protecting at the same time the area outside the VT, and the second that patterns the Si between the VT and the MT, creating a high-quality vertical facet with low roughness at the front side of the taper. The top view of the mode transfer module includes the photoresist covering the area outside the vertical coupler in FIG. 24a. FIG. 24b illustrates an embodiment of the cross-sectional view after patterning the vertical coupler in the mode transfer area and the vertical coupler (VT). There are two kinds of resists that may be applied in this step.

FIG. 24c illustrates the cross section of the mode transfer module after the third patterning process. A layer of highly reflective metal is deposited on the surface of the vertical coupler (VT).

Interconnections at the mode transfer module area are fabricated. FIGS. 25a and 25b illustrate the cross-sectional views of this pad process before and after the etching step. A layer of photoresist is disposed first (25a) and etched after (25b) during patterning of the pad layer for the front piece and the tapered silicon area in the mode transfer module.

FIG. 26a illustrates the top view and FIG. 26b shows the cross-sectional view in patterning the pad layer for the vertical coupler in the mode transfer area.

FIG. 27 illustrates the cross-sectional view after depositing SiOx and SiN and patterning the pad layer in the laser cavity area and the optical modulator area.

The above descriptions have disclosed the structure and fabrication steps of the optical interconnect device with the universal coupler being a vertical coupler to adapt to a perpendicularly placed external optical fiber.

The following descriptions disclose embodiments of an in-plane placed universal coupler for an external optical fiber placed along the laser light direction.

FIG. 28 is a schematic diagram of an optical interconnect device with in-plane placed optical fiber, according to another exemplary embodiment.

The interconnect device is fabricated on the top surface of a substrate (shown in FIG. 29). An in-plane laser emits a laser beam into laser cavity 1010. The laser cavity is typically followed by a laser grating area. The laser beam propagates along the surface of the substrate and enters the in-plane optical modulator 1020. The optical modulator 1020 can be a traditional Mach-Zehnder Interferometer style modulator. As an example, it can be an advanced Franz Keldysh-Modulator (FK Modulator), which is an electro-absorption (EA) device based on the Franz-Keldysh effect for bulk semiconductors, where an applied electric field modifies and distorts the energy bands of the material in the FK Modulator.

In FIG. 28, a tapered silicon piece 1030 and a universal coupler 140 are combined to form the mode transfer module. The universal coupler 1040 in FIG. 28 propagates the laser beam without changing its propagating direction. However, the universal coupler can be made to direct the laser beam to other directions. Other directions different from these two examples—0 degree or 90 degree—can be achieved by properly designed universal couplers.

The modulated light enters a tapered silicon piece 1030 and the output light from the tapered piece 1030 is a much-enlarged light beam with a size matching the dimension of the external optical fiber 1060, and in particular matching the dimension of the fiber core. A surface lens 1050 placed in front of the external optical fiber focuses the exiting beam from the universal coupler 1040 into the single mode fiber 1060 for better coupling efficiency. The surface lens 1050 can be a fused-in lens on the front end of the fiber 1060.

FIG. 29 shows a detailed view of the optical interconnect device with in-plane placed fiber in FIG. 28.

FIG. 29 is a detailed cross-sectional view of the optical interconnect device with in-plane placed fiber in FIG. 28. A substrate is shown as the support for the interconnect device. The substrate can be a silicon wafer, a Si-on-Insulator or SOI wafer, or a separate thin plate bonded to the substrate. For silicon photonic device, silicon substrate is more commonly used. FIG. 29 shows on the left a laser light emitted by a laser (not shown), a front end laser cavity and laser grating piece (LSGT), followed by an in-plane FK modulator, and a mode transfer module including a tapered silicon piece and an in-plane coupler to transmit the light beam into a lens and an external optical fiber. The FK modulator structure includes a silicon waveguide piece (WGSi), a germanium waveguide (WGGe) which contains a germanium-silicon mixture, a silicon bending piece (Bend), an Echelle Grating (Echelle), and a interconnecting output port (Pad).

FIG. 30 illustrates the schematic diagram of the fabrication process flow.
a. Step 901 includes providing a Si substrate and an in-plane laser;
b. Step 902 describes fabricating a laser cavity module on a top surface of the Si substrate, wherein the laser cavity module transmits the in-plane laser's light;
c. Step 903 describes fabricating an optical modulator connecting to the laser cavity module on the same surface of the Si substrate;
d. Step 904 describes fabricating a mode transfer module comprising a tapered Si portion to expand the laser light to a larger beam spot and a universal coupler to direct the laser light to either a perpendicularly placed or an in-plane single mode optical fiber;
e. Step 905 describes packaging the laser cavity module, the optical module and the mode transfer module into an integrated optical interconnect system; and
f. Step 906 describes finishing the product by assembling the laser, the optical interconnect system, and the optical fiber.

Example Simulation Results

Simulations of the functions and characteristics have been performed and the results are described in the following figures.

FIG. 31 shows the simulation results of the mode transferred light spot images for a tapered mode transfer device at different longitudinal axial lengths (W) of the tapering. The tapered piece has a non-liner tapering shape, which the inventors have found to be more efficient than a linearly tapered (straight line) mode transfer module. The universal coupler does not change the spot behaviors.

FIG. 32a summarizes the simulation results of the mode transfer loss and polarization-dependent-loss (PDL) versus taper length for linear and nonlinear tapered silicon mode transfer modules. The upper curve represents the linear taper result and the lower curve represents the non-linear taper results. As shown in the figure, the non-linear tapering reduces the loss significantly. FIG. 32b expands the non-linear taper result on a larger scale to show details of the loss.

Results of the three simulations demonstrate the use of a silicon waveguide. FIGS. 33a, 33b, and 33c demonstrate the simulation results of single mode fiber (SMF) fiber to MT face coupling loss with different MT-to-fiber gaps with a 13 µm silicon waveguide. FIG. 33a shows the horizontal misalignment impacts on three gaps. The top curve is for a 20 µm gap, the middle curve is for a 10 µm gap, and the bottom curve is for 0 µm gap. FIG. 33b shows the vertical misalignment impacts on three gaps. The top curve is for a 20 µm gap, the middle curve is for a 10 µm gap, and the bottom curve is for 0 µm gap. The simulation demonstrates that the smaller the gap is, the less the loss is. FIG. 33c plots the coupling loss versus the MT-to-fiber gap, showing that the coupling loss increases quickly with the gap.

In utilizing the various aspects of the embodiments, it would become apparent to one skilled in the art in light of this disclosure that combinations or variations of the above embodiments are possible for fabricating optical coupling structures. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Which is claimed is:

1. A method of fabricating an optical interconnect apparatus, comprising:
    providing a Si substrate having a top surface and a bottom surface, wherein the top surface is divided into a laser cavity area, an optical modulator module area integrated to the laser cavity area, and a mechanical transfer area, all sequentially disposed along a same direction, wherein the bottom surface has an embedded layer of oxide;
    fabricating a laser cavity module in the laser cavity area on the top surface of the Si substrate, wherein the laser cavity module is configured to transmit an in-plane laser light;
    fabricating an optical modulator module connecting to the laser cavity module on the top surface of the Si substrate;
    fabricating a mechanical transfer module comprising a tapered structure configured to expand the in-plane laser light to a larger beam spot, a universal coupler configured to control a propagating direction of the laser light into an external single mode optical fiber;
    packaging the laser cavity module, the optical modulator module, and the mechanical transfer module into an integrated optical interconnect system; and
    assembling a laser, the integrated optical interconnect system, a surface lens, and the external single mode optical fiber.

2. The method of fabricating the optical interconnect apparatus of claim 1, wherein fabricating the laser cavity module in the laser cavity area comprises:
    patterning a laser cavity and a plurality of in-plane grating structures;
    patterning alignment marks; and
    depositing SiN and SiOx layers on the plurality of in-plane grating structures.

3. The method of fabricating the optical interconnect apparatus of claim 1, wherein fabricating the optical modulator module in the optical module area connecting to the laser cavity module comprises:
    forming silicon modulator structures, comprising:
        depositing a silicon oxide layer in a first sub-area of the optical module area on the top surface of the Si substrate;
        patterning the silicon modulator structures in the first sub-area of the optical module area, exposing the embedded layer of oxide of the bottom surface of the silicon substrate;
        performing selective epitaxial growth of silicon on walls of trenches in the first sub-area of the optical module area;
        performing non-selective epitaxial growth of silicon on top of the selective epitaxial silicon to overfill the trenches the first sub-area;
        performing CMP on the trenches, wherein the ClVIP is controlled to expose the silicon oxide layer outside the trenches and leave a predetermined dishing depth inside the trenches; and
        annealing the optical module area.

4. The method of fabricating the optical interconnect apparatus in claim 3, wherein fabricating the optical module in the optical module area further comprises forming germanium modulator structures by:
    depositing a silicon nitride layer in a second sub-area of the optical module area;
    depositing a silicon oxide layer on the silicon nitride in the second sub-area of optical module area;
    patterning the germanium modulator structures in the second sub-area of the optical module area, wherein the patterning exposes the embedded layer of oxide on the bottom surface of the Si substrate inside trenches;
    performing selective epitaxial growth of silicon on walls of the trenches in the second sub-area of the optical module area;
    performing selective epitaxial growth of mixed silicon and germanium on the selective epitaxial silicon on walls of the trenches in the second sub-area of the optical module area, wherein the mixed silicon and germanium has a ratio of Ge:Si in a range of 0.02 to 0.3;
    performing non-selective epitaxial growth of mixed silicon and germanium on top of the selective epitaxial silicon to overfill the trenches;
    performing CMP on the trenches, wherein the ClVIP is controlled to expose the silicon oxide layer outside the trenches and leave the predetermined dishing depth inside the trenches; and
    annealing the optical module area.

5. The method of fabricating the optical interconnect apparatus of claim 4, wherein forming the germanium modulator structures in the second sub-area of the optical module area further comprises:
    patterning the germanium modulator structures to be spaced apart from walls of the trenches;
    depositing polysilicon in the space next to the germanium modulator structures;
    doping N++ at one side of each of the germanium modulator structures by implanting N-type ions;
    doping P++ at another side of said germanium modulator structures by implanting P-type ions; and
    annealing the polysilicon.

6. The method of fabricating the optical interconnect apparatus of claim 5, wherein fabricating the optical modulator module in the optical module area further comprises:
    patterning a waveguide structure in the first and second sub-areas of the optical module area, wherein the waveguide structure comprises:
    a facet structure in front of the laser cavity module;
    an optical bend structure next to the silicon modulator structures; and an Echelle grating structure next to the germanium modulator structures, wherein the Echelle grating structure is patterned to have a metal layer on facing side surfaces.

7. The method of fabricating an optical interconnect apparatus of claim 6, wherein fabricating the mechanical transfer module in the mechanical transfer area comprises:

patterning the tapered structure in an opening in the silicon substrate, wherein the tapered structure increases its cross-sectional size gradually along the direction of the waveguide;

depositing oxide over the tapered structure; and forming the universal coupler configured to transmit the expanded light beam into the external optical fiber along the first direction in a case when the external optical fiber is placed along the first direction.

8. The method of fabricating an optical interconnect apparatus of claim 6, wherein fabricating the mechanical transfer module in the mechanical transfer area comprises:

patterning the tapered structure in an opening in the silicon substrate, wherein a cross-sectional size of the tapered structure perpendicular to the first direction increases gradually along the direction of the waveguide;

disposing a first layer of photoresist using a gray tone mask to pattern the vertical coupler, wherein the first layer of photoresist covers the area outside the vertical coupler;

depositing oxide over the tapered structure; and forming the universal coupler as a sloped mirror structure next to the tapered structure with a second layer of photoresist in a case when the external single mode optical fiber is perpendicularly placed to the first direction, wherein the sloped mirror structure is configured to change the direction of laser light coming from the tapered structure by 90 degrees into the surface lens and the external single mode optical fiber, and wherein the sloped mirror structure is coated with a high reflective metal material.

9. The method of fabricating an optical interconnect apparatus of claim 6, further comprises depositing an anti-reflective coating on the waveguide and the tapered structures.

10. The method of fabricating an optical interconnect apparatus in claim 1, wherein the tapered structure increases its cross-sectional size linearly.

11. The method of fabricating an optical interconnect apparatus in claim 1, wherein the tapered structure increases its cross-sectional size non-linearly.

* * * * *